United States Patent
Headley

(10) Patent No.: US 11,833,457 B2
(45) Date of Patent: Dec. 5, 2023

(54) SUPPORT BEAM FOR SUPPORTING INTERNALS WITHIN A MASS TRANSFER COLUMN

(71) Applicant: Koch-Glitsch, LP, Wichita, KS (US)

(72) Inventor: Darran Matthew Headley, Valley Center, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 17/954,924

(22) Filed: Sep. 28, 2022

(65) Prior Publication Data

US 2023/0101452 A1   Mar. 30, 2023

Related U.S. Application Data

(60) Provisional application No. 63/250,214, filed on Sep. 29, 2021.

(51) Int. Cl.
*B01D 3/32* (2006.01)

(52) U.S. Cl.
CPC .................... *B01D 3/326* (2013.01)

(58) Field of Classification Search
CPC .................................................. B01D 3/326
See application file for complete search history.

(56) References Cited

U.S. PATENT DOCUMENTS

| 4,195,064 | A | 3/1980 | Betteken et al. | |
|---|---|---|---|---|
| 8,485,504 | B2 * | 7/2013 | Headley | B01D 3/326 261/114.5 |
| 8,944,418 | B2 * | 2/2015 | Headley | B01D 3/32 261/114.5 |
| 9,295,926 | B2 * | 3/2016 | Nieuwoudt | B01D 3/326 |
| 10,246,875 | B2 * | 4/2019 | Clausen | B01J 19/305 |
| 10,471,370 | B1 * | 11/2019 | Richardson | B01D 3/141 |
| 2012/0111717 | A1 | 5/2012 | Headley et al. | |
| 2012/0228251 | A1 * | 9/2012 | Headley | B01D 3/326 211/124 |
| 2012/0292791 | A1 * | 11/2012 | Headley | B01D 3/32 261/114.5 |

(Continued)

FOREIGN PATENT DOCUMENTS

| EP | 2683952 A2 | 1/2014 | |
|---|---|---|---|
| JP | 2018070159 A * | 5/2018 | B65D 90/00 |
| WO | 2016210387 A1 | 12/2016 | |

OTHER PUBLICATIONS

International Search Report and Written Opinion received for PCT Application No. PCT/IB2022/059256, dated Jan. 5, 2023, 10 pages.

*Primary Examiner* — Jonathan Miller

(57) ABSTRACT

A support beam is provided for supporting an internal such as a structured or grid packing within a mass transfer column. The support beam has an elongated web and upper and lower open flanges respectively positioned at upper and lower edge portions of the web. Each of the upper and lower open flanges has reinforcement rails that extend along a longitudinal length of the web and are spaced from opposed first and second faces of the web by spacers to create open fluid flow channels between the reinforcement rails and the first and second faces of the web. The upper and lower open flanges strengthen the web against deflection while minimizing horizontal surfaces that may lead to accumulation and growth of solids that may interfere with fluid flow to and from the internal.

20 Claims, 22 Drawing Sheets

(56) References Cited

U.S. PATENT DOCUMENTS

2013/0234348 A1* 9/2013 Nieuwoudt ............ B01D 3/326
        261/114.5
2023/0101452 A1* 3/2023 Headley ................ B01D 3/326
        202/266

* cited by examiner

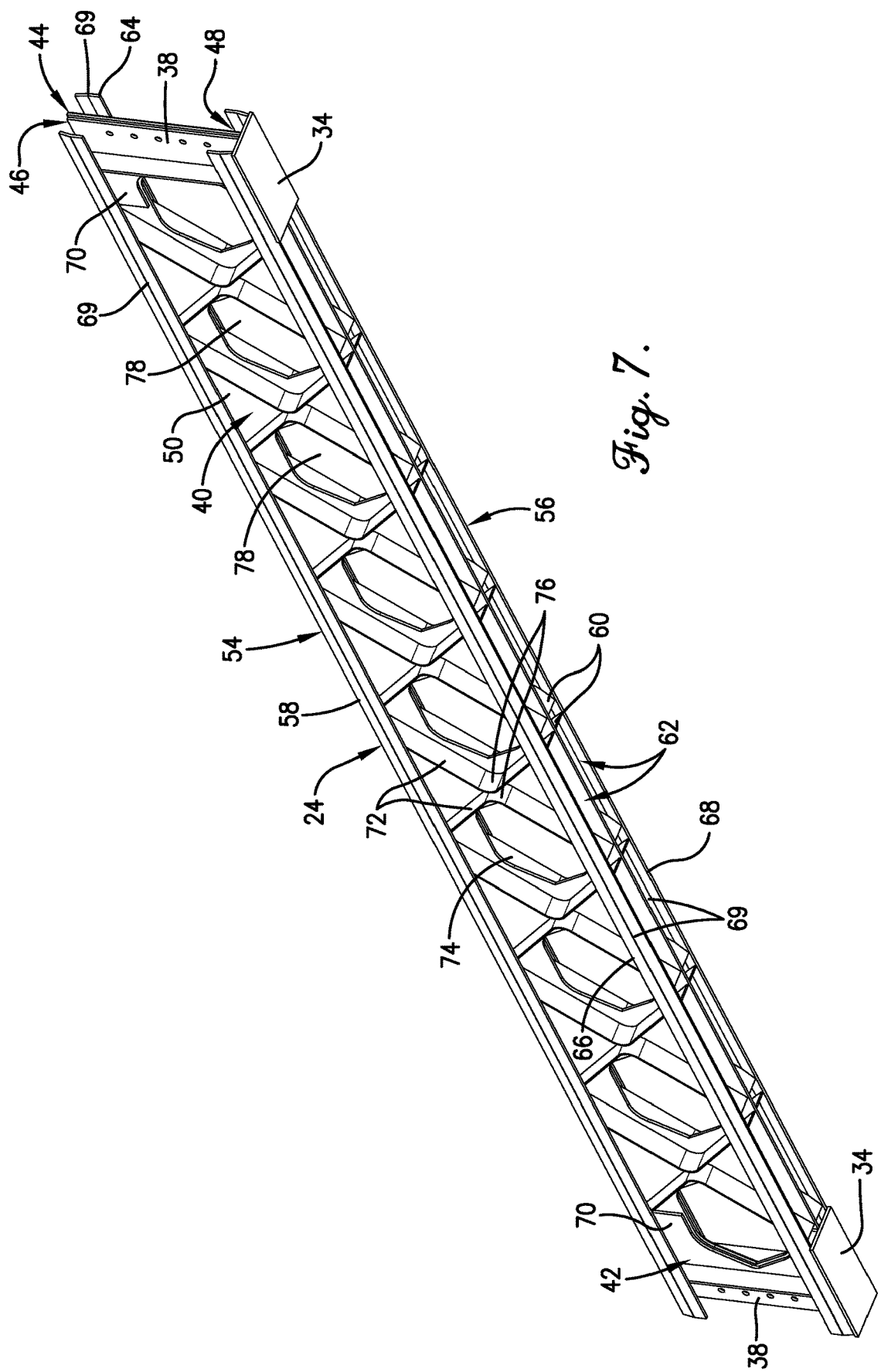

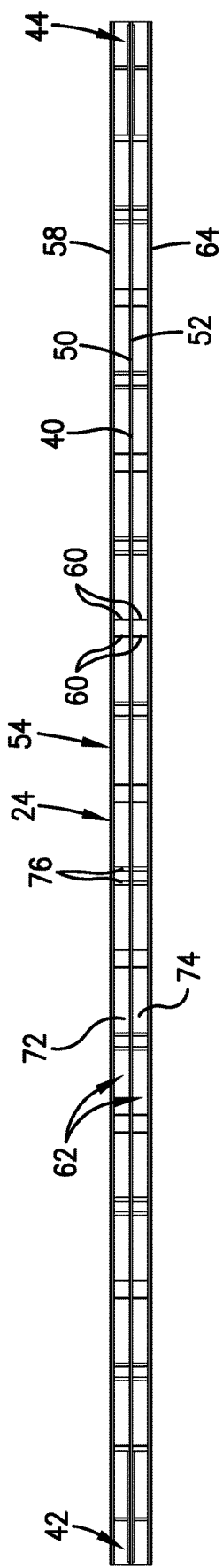
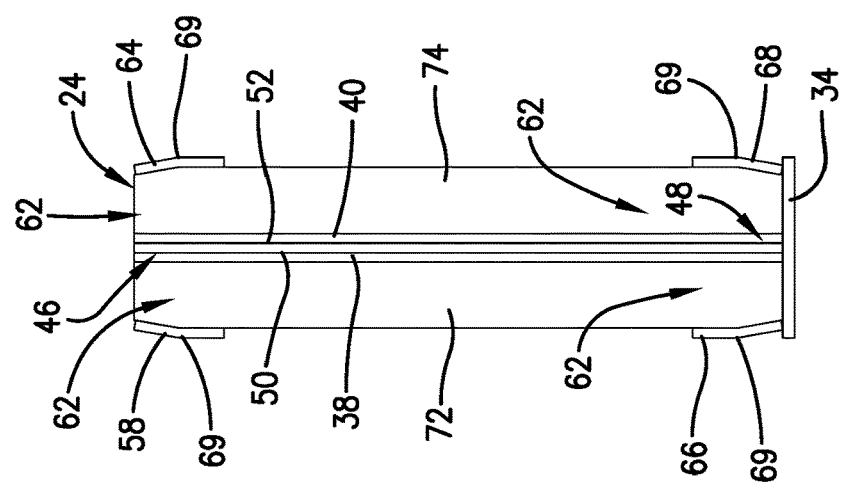

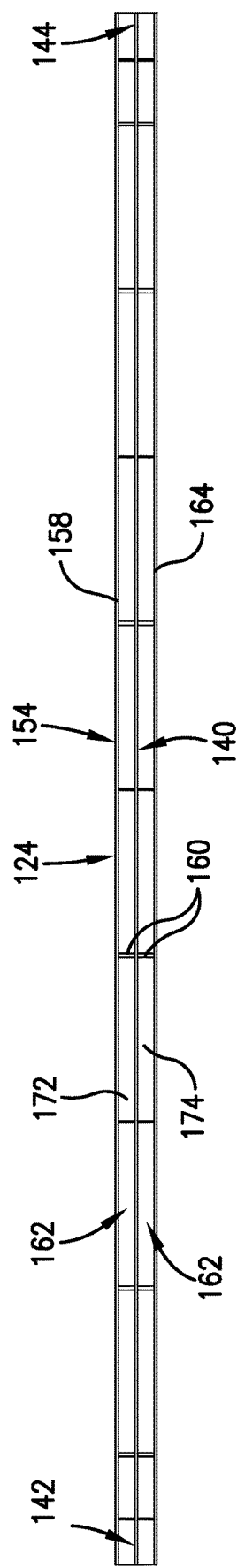
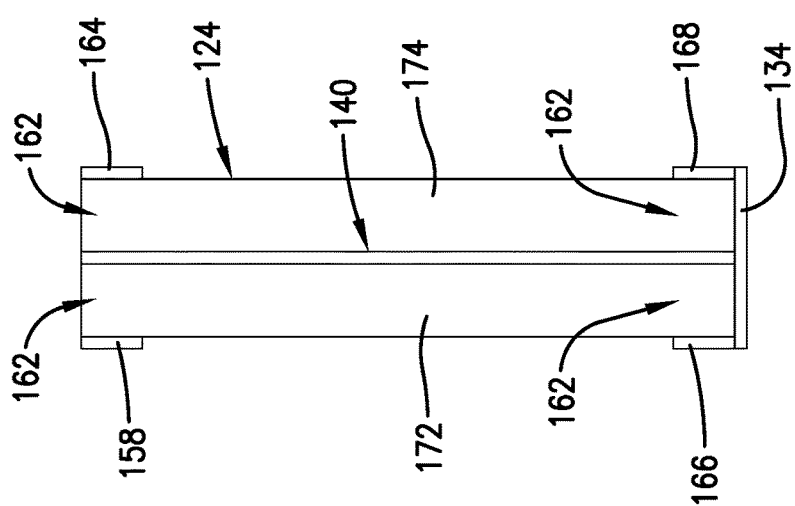
Fig. 12.
Fig. 13.

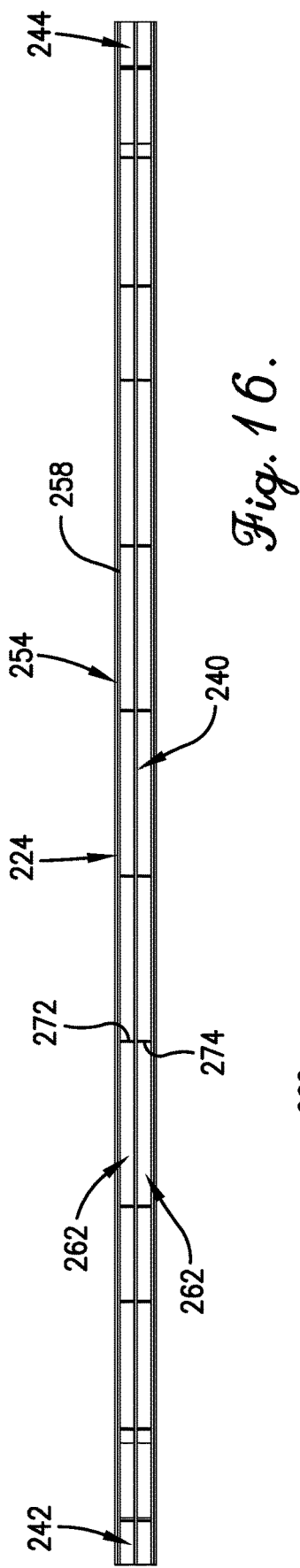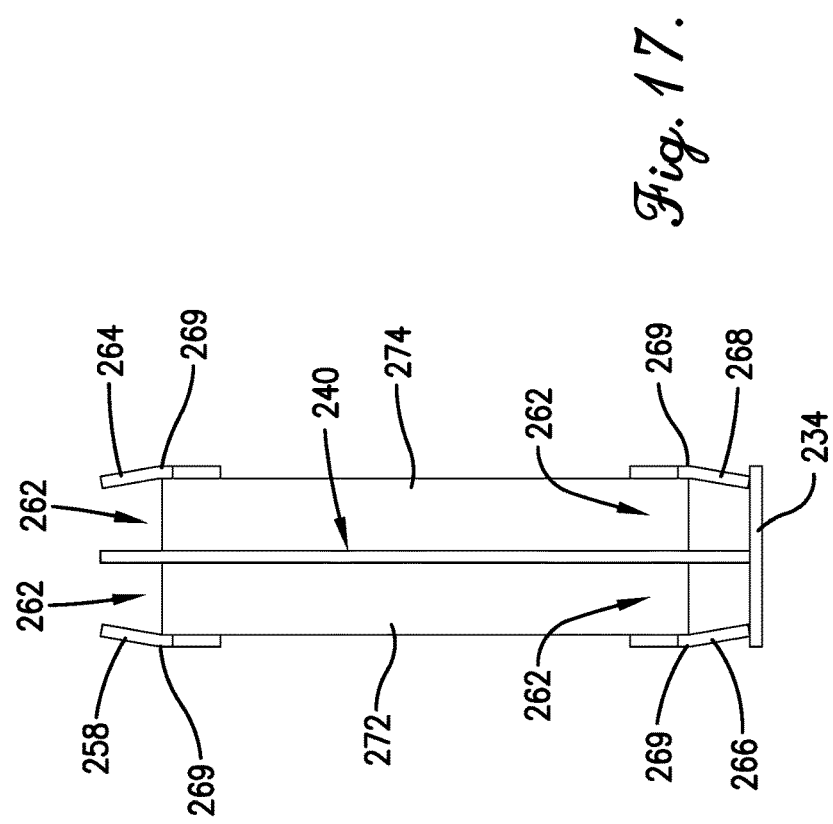

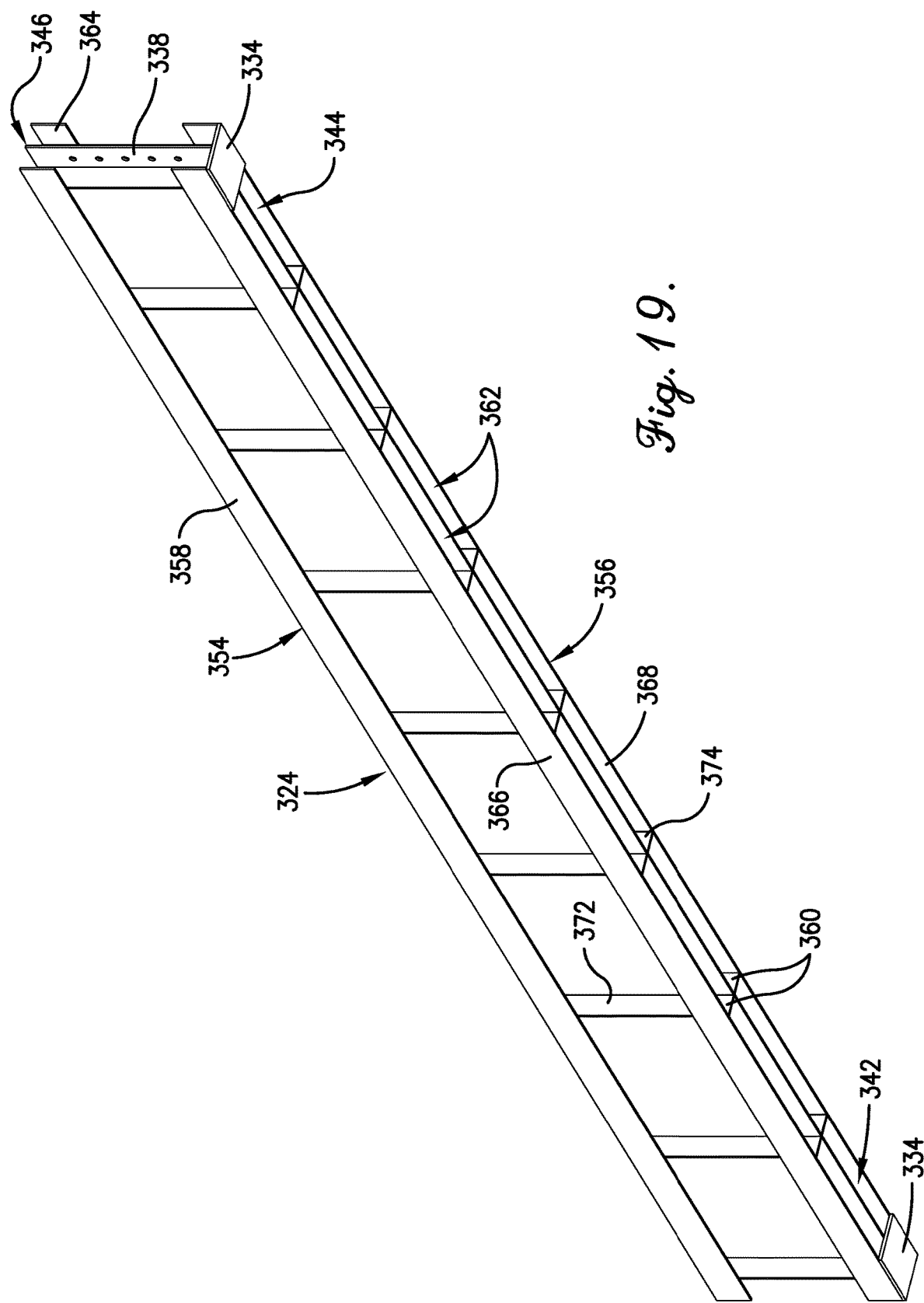

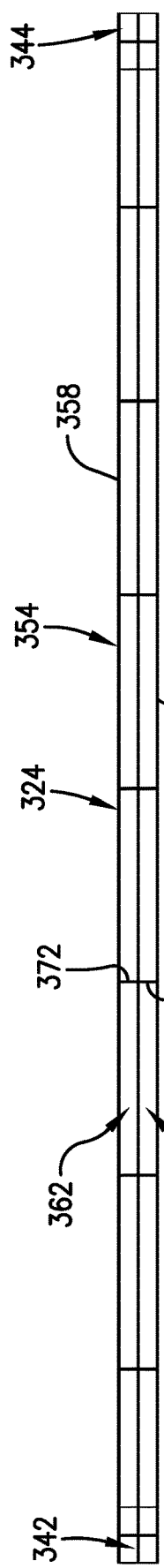
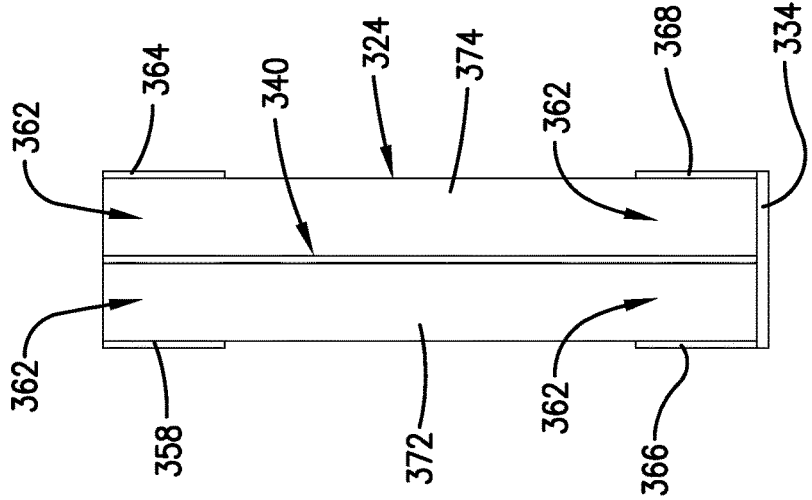

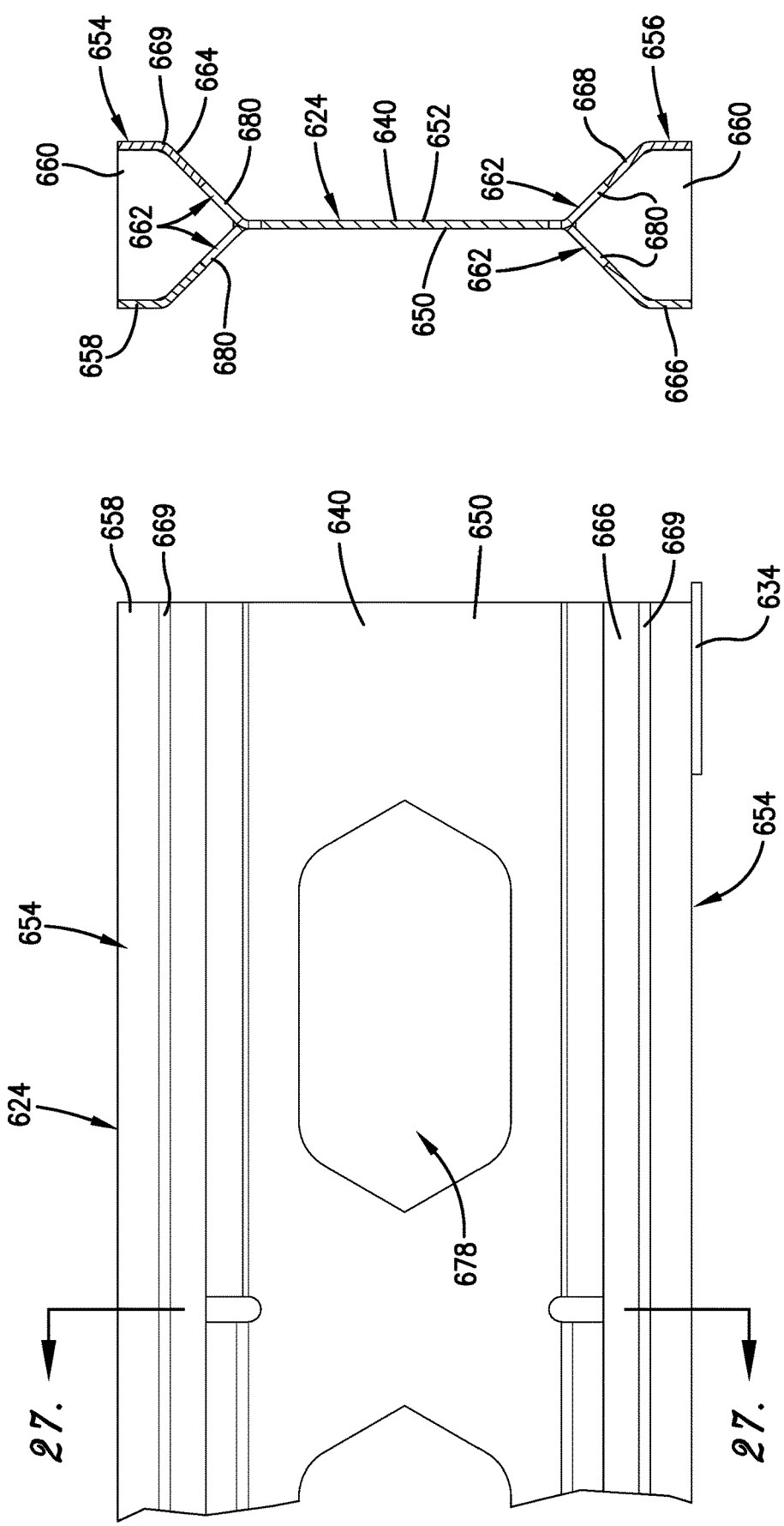

SUPPORT BEAM FOR SUPPORTING INTERNALS WITHIN A MASS TRANSFER COLUMN

RELATED APPLICATION

This application claims priority to U.S. Provisional Patent Application No. 63/250,214 filed Sep. 29, 2021, with the above-identified application being incorporated by reference herein in its entirety.

BACKGROUND

The present invention generally relates to apparatus for supporting internals such as packing supports, liquid collectors, liquid distributors, and vapor-liquid contact devices in mass transfer columns in which mass transfer and/or heat exchange processes occur.

Various types of internals, such as grid packing, structured packing, random packing, and cross-flow trays, are used in mass transfer columns to facilitate the desired interaction between fluids streams flowing in countercurrent relationship within an open internal region within the column. The term "mass transfer column" as used herein is not intended to be limited to columns in which mass transfer is the primary objective of the processing occurring within the column but is also intended to encompass columns in which heat transfer rather than mass transfer is the primary objective of the processing. Some examples of mass transfer columns include cross flow liquid-vapor contactors, absorbers, separators, distillation columns, divided wall columns, liquid-liquid extractors, scrubbers, and evaporators, which facilitate heat and/or mass transfer between two or more fluid phases.

The various types of packings used in mass transfer columns are typically supported on packing plates or grids that, in turn, are supported on support rings secured to an inner surface of a shell of the mass transfer column. Liquid collectors, liquid distributors, cross-flow trays, and other internals may similarly be supported by support rings, bolting bars or other structures welded or otherwise secured to an inner surface of the shell of the mass transfer column. In larger diameter mass transfer columns, additional supports in the nature of beams and trusses are commonly used to resist the deflection or sagging of the internals that might otherwise result from the weight of the internals and the various types of loads, including uplift or upset forces, exerted on the internals by the fluid streams.

The mass transfer columns used in many types of refining separation processes, as well as in some petrochemical and chemical processes, are subjected to severe operating conditions that may lead to fouling, coking, erosion, corrosion, vibration, and upsets of the various internals. Fouling and coking of the internals is particularly problematic in that it causes deterioration of the capacity, pressure drop, and efficiency of the packing and/or other internals. After sufficient deterioration in performance has occurred, the mass transfer column must be shut down to clean or replace the affected internals.

In order to reduce the opportunity for fouling and coking to occur in beds of packing, grid packings have been developed in which there are no horizontal surfaces on which liquid holdup is able to occur. Because liquid can drain freely from the inclined surfaces of the packing, the opportunity for solids to collect and grow on the packing is reduced. Less attention, however, has been paid to the opportunity for liquid holdup to occur on the beams that are used to support the packing beds and other internals. In particular, the horizontal flanges of the beams may lead to fouling and coking that impedes performance by blocking fluid flow to and from the packing bed or other internals supported by the beams. A need has thus developed for an improved beam design that reduces the opportunity for accumulation and growth of solids on the beams, including in severe service applications.

SUMMARY

In one aspect, the present invention is directed to a support beam for supporting an internal within a mass transfer column. The support beam comprises: an elongated web having opposed end portions, a longitudinal length extending in a direction between the opposed end portions, an upper edge portion, a lower edge portion, and opposed first and second faces; an upper open flange positioned at the upper edge portion of the web; and a lower open flange positioned at the lower edge portion of the web.

The upper open flange has opposed ends and comprises: a first reinforcement rail extending along the longitudinal length of the web and spaced from the first face of the web by spacers positioned at spaced apart locations along the longitudinal length of the web to create open fluid flow channels between the first reinforcement rail and the first face of the web, and a second reinforcement rail extending along the longitudinal length of the web and spaced from the second face of the web by additional ones of the spacers positioned at spaced apart locations along the longitudinal length of the web to create additional ones of the open fluid flow channels between the first reinforcement rail and the second face of the web.

The lower open flange similarly comprises: a third reinforcement rail extending along the longitudinal length of the web and spaced from the first face of the web by spacers positioned at spaced apart locations along the longitudinal length of the web to create additional ones of the open fluid flow channels between the third reinforcement rail and the first face of the web, and a fourth reinforcement rail extending along the longitudinal length of the web and spaced from the second face of the web by additional ones of the spacers positioned at spaced apart locations along the longitudinal length of the web to create additional ones of the open fluid flow channels between the first reinforcement rail and the second face of the web.

In another aspect, the present invention is directed to a mass transfer column comprising: a shell defining an open internal region; a fluid inlet in the shell for introducing a fluid through the shell and into the open internal region; a fluid outlet in the shell for removing a fluid from the open internal region through the shell; a plurality of support beams as described above and extending in parallel and sideways-spaced-apart relationship across a horizontal cross section of the mass transfer column within the open internal region and secured at opposite ends to the shell; and an internal positioned within the open internal region and supported by the plurality of support beams.

In a further aspect, the present invention is directed to a support beam as described above wherein the first, second, third, and fourth reinforcement rails and the spacers extend upright and further including: bearing plates extending transversely and affixed to an underside of the web and the lower open flange at their opposite end portions; upright stiffening plates extending between the first face of the web and the first and third reinforcement rails at both of their opposite end portions and between the second face of the web and the second and fourth reinforcement rails at both of their opposite end portions; spaced openings in the web to allow fluid to pass through the web from the opposed first and second faces; bends in the first, second, third, and fourth reinforcement rails along their longitudinal lengths to strengthen them against deflection; and first truss members having opposite ends and extending along the first face of the web and joined at their opposite ends to the first and third reinforcement rails and the first face of the web and second truss members having opposite ends and extending along the second face of the web and joined at their opposite ends to the second and fourth reinforcement rails, wherein the first and second truss members extend upright, diagonally, or diagonally with a reverse bend.

BRIEF DESCRIPTION OF THE FIGURES

In the accompanying drawings that form part of the specification and in which like reference numerals are used to indicated like components in the various views:

FIG. 7 is a bottom perspective view of the first embodiment of the support beam;

FIG. 8 is a top plan view of the first embodiment of the support beam;

FIG. 9 is an end elevation view of the first embodiment of the support beam;

FIG. 12 is a top plan view of the second embodiment of the support beam;

FIG. 13 is an end elevation view of the second embodiment of the support beam;

FIG. 16 is a top plan view of the third embodiment of the support beam;

FIG. 17 is an end elevation view of the third embodiment of the support beam;

FIG. 19 is a bottom perspective view of the fourth embodiment of the support beam;

FIG. 20 is a top plan view of the fourth embodiment of the support beam;

FIG. 21 is an end elevation view of the fourth embodiment of the support beam;

FIG. 26 is an enlarged, fragmentary side elevation view of the seventh embodiment of the support beam; and FIG. 27 is an end elevation view of the seventh embodiment of the support beam taken in vertical section along line 27-27 in the direction of the arrows in FIG. 26.

DESCRIPTION

Figure 1:
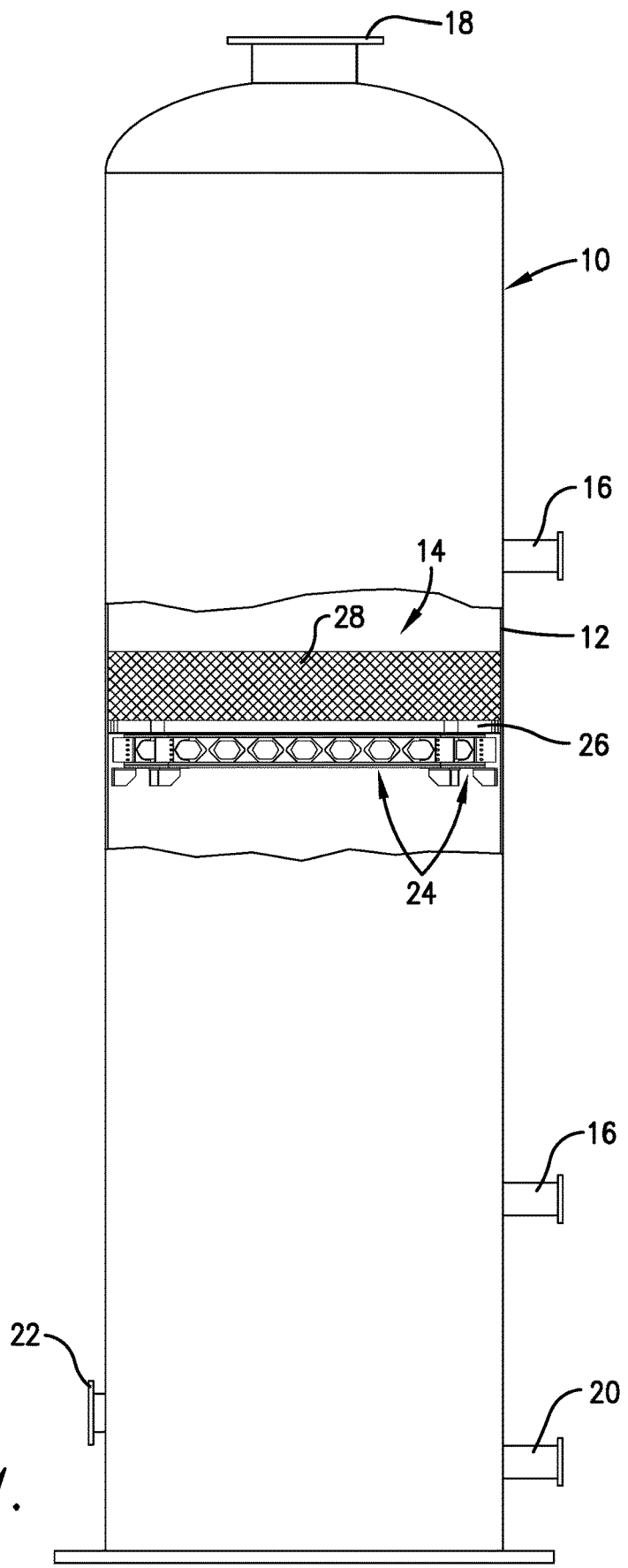
FIG. 1 is a side elevation view of a mass transfer column in which a portion of a shell of the mass transfer column is broken away to show two support beams in accordance with a first embodiment of the present invention supporting a packing grid and a schematically-represented bed of packing.

Turning now to the drawings in greater detail and initially to FIG. 1, a mass transfer column suitable for use in processes in which mass transfer and/or heat exchange is intended to occur between co-current or countercurrently flowing fluid streams is represented generally by the numeral 10. Mass transfer column 10 includes an upright, external shell 12 that is generally cylindrical in configuration, although other configurations, including polygonal, are possible and are within the scope of the present invention. Shell 12 is of any suitable diameter and height and is constructed from one or more materials that are desirably inert to, or are otherwise compatible with, the fluids and the process conditions that are present during operation of the mass transfer column 10.

Mass transfer column 10 may generally be of a type used for processing fluid streams, typically liquid streams or liquid and vapor streams, to obtain fractionation products and/or to otherwise cause mass transfer and/or heat exchange between the fluid streams. For example, mass transfer column 10 may be one in which crude atmospheric, lube vacuum, fluid or thermal cracking fractionating, coker or visbreaker fractionating, coke scrubbing, reactor off-gas scrubbing, gas quenching, edible oil deodorization, pollution control scrubbing, and other processes occur. The mass transfer column 10 may be used in refining separation processes and petrochemical and chemical processes that are subject to severe operating conditions such as fouling, coking erosion, corrosion, vibration, and frequent upsets of internals. For example, the mass transfer column 10 may be operated as a coker main fractionator, an atmospheric or vacuum crude tower, a fluid catalytic cracking ("FCC") reactor/regenerator, an FCC main fractionator, an FCC main fractionator overhead separator, an ethylene quench column, and the various quench, absorber, recovery, and drying columns in an acrylonitrile plant.

The shell 12 of the mass transfer column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams or an ascending gas stream and a descending liquid stream.

The fluid streams are directed to the mass transfer column through any number of fluid inlets 16 positioned at appropriate locations along a height of the mass transfer column 10. One or more vapor streams may also be generated within the mass transfer column 10 rather than or in addition to being introduced into the mass transfer column 10 through the fluid inlet(s) 16. The mass transfer column 10 will also typically include an overhead fluid outlet 18 for removing a vapor product or byproduct and a bottom stream takeoff fluid outlet 20 for removing a liquid product or byproduct from the mass transfer column 10. A manway 22 provides a closeable opening of a preselected diameter through the shell 12 to allow a person to enter and exit the open internal region 14 within the mass transfer column 10, such as for installation, inspection, and repair or replacement of internals positioned within the open internal region 14. The manway 22 also serves to allow component parts of the internals to be passed through the manway 22 during installation and removal of the internals. Other mass transfer column components that are typically present, such as reflux stream lines, reboilers, condensers, vapor horns, and the like, are not illustrated in the drawings because they are conventional in nature and an illustration of those components is not believed to be necessary for an understanding of the present invention.

Two support beams 24 constructed according to one embodiment of the present invention are shown positioned within the open internal region 14 of the mass transfer column 10. Only one of the support beams 24 is seen to its full extent in FIG. 1, with opposed end portions of the second support beams 24 being seen because it is positioned behind the one support beam 24 and is longer due to the curvature of the shell 12. A plurality of the support beams 24 provide support for a packing grid 26 that is shown positioned on top of a plurality of the support beams 24. The packing grid 26, in turn, provides support for a bed of packing 28 that is shown resting on top of the packing grid 26. The packing 28 is shown schematically because it may be of conventional construction, such as any of various types of grid, structured, and random packings. In one embodiment, the packing 28 is a grid packing specially constructed for severe service applications using heavier gauge, smooth, mass transfer surfaces that are inclined with respect to the horizontal to reduce the opportunity for liquid holdup and fouling or coking on the surfaces. It is to be understood that the support beams 24 may be used to provide support for other types of internals in other ways besides what is illustrated in FIG. 1.

Figure 2:
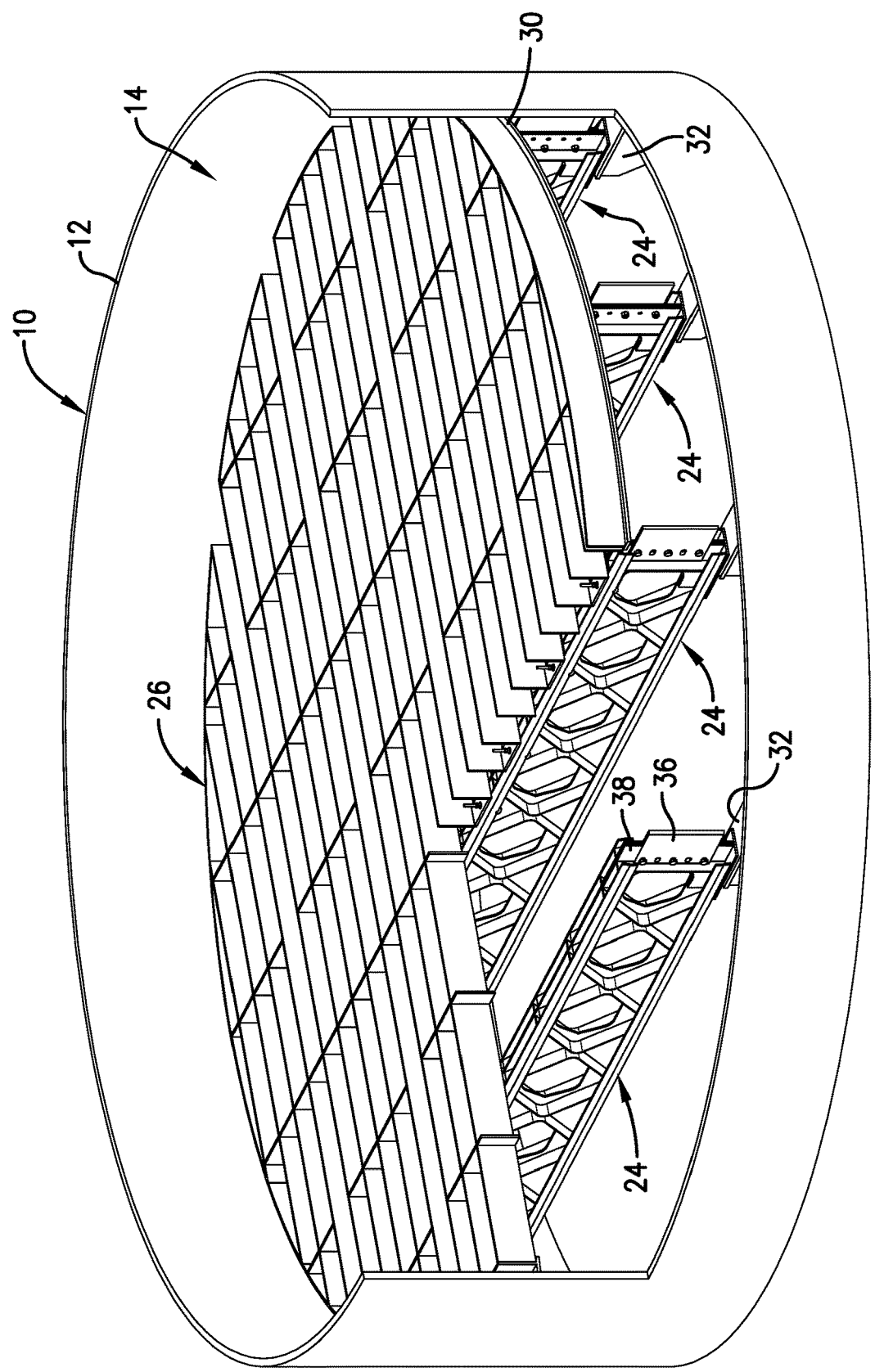
FIG. 2 is a fragmentary, perspective view of the mass transfer column with the bed of packing removed to better illustrate the support beams and the packing grid and shown on an enlarged scale from that shown in FIG. 1.
Figure 3:
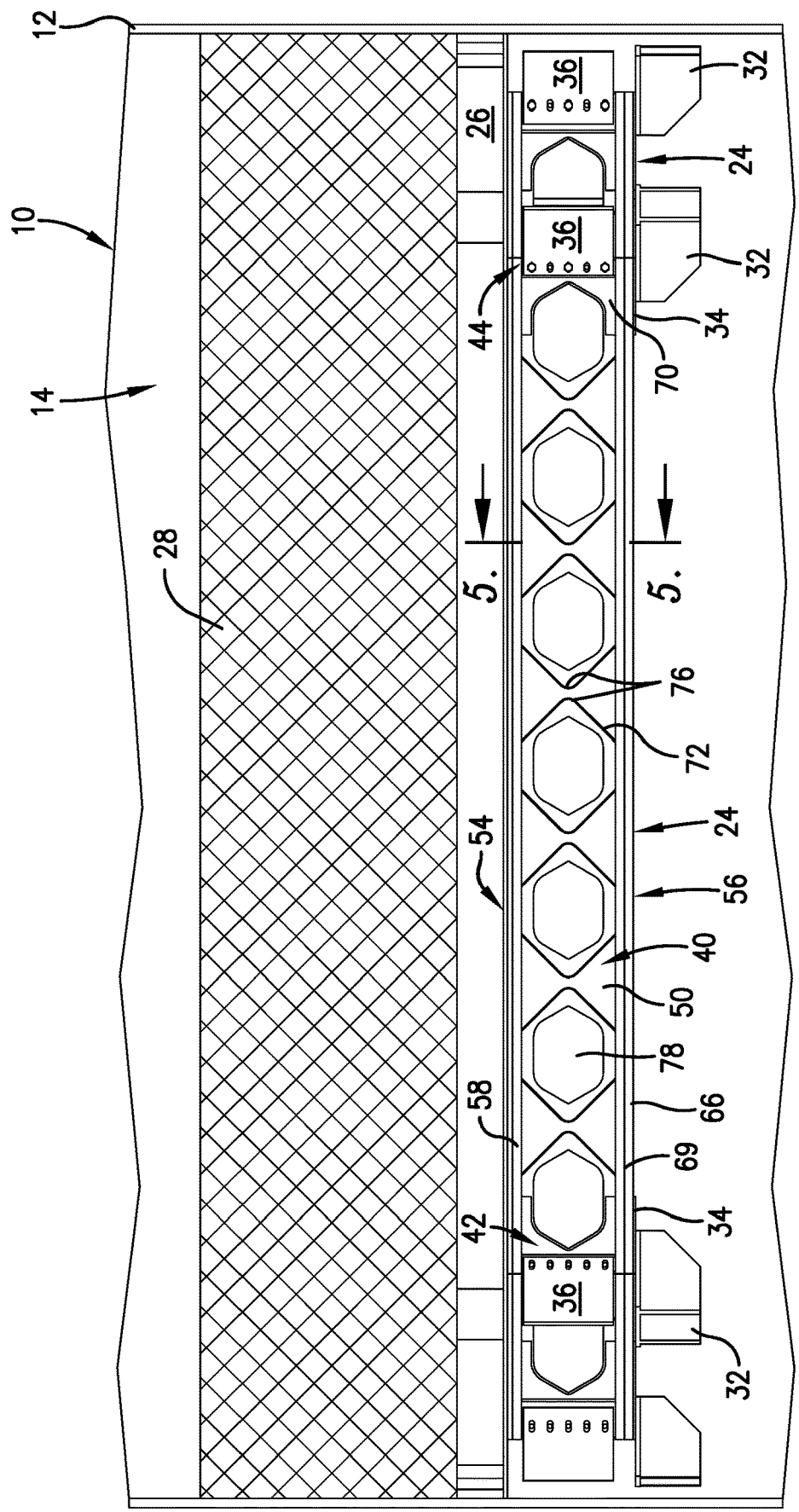
FIG. 3 is a fragmentary, side elevation view of the mass transfer column.
Figure 4:
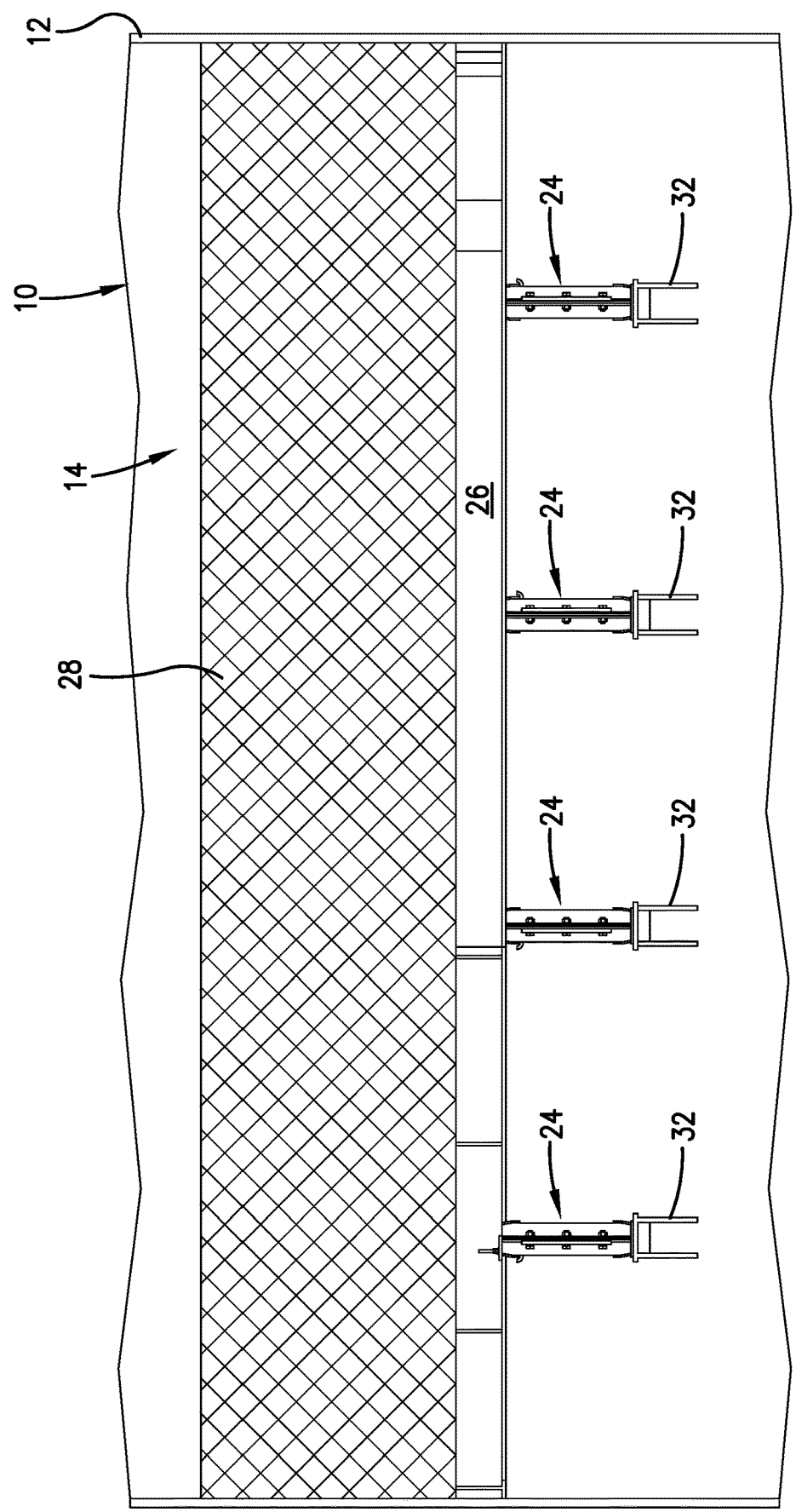
FIG. 4 is a fragmentary, side elevation view of the mass transfer column rotated 90 degrees from the view shown in FIG. 3.

Turning now to FIGS. 2-4, a plurality of the support beams 24 are extend chordally in a parallel and sideways-spaced-apart relationship across a horizontal cross section of the mass transfer column 10 within the open internal region 14. The support beams 24 are secured at their opposite ends to an inner surface of the shell 12, such as in a manner described below. The packing grid 26 rests on top of and is supported, at least in part, by the support beams 24. In the illustrated embodiment, the packing grid is also supported by a support ring 30 that is welded or otherwise secured to the inner surface of the shell 12. As shown in FIG. 3, the packing 28 rests on top of the packing grid 26 and is supported by both the packing grid 26 and the plurality of support beams 24. A series of J-bolts 31 shown in FIGS. 4 and 5, or other connectors, are used to join the support beams 24 to the packing grid 26 to resist or prevent uplift of the packing grid 26 during upsets that might occur during operation of the mass transfer column 10.

The opposite ends of each of the support beams 24 are attached to an inner surface of the shell 12 in a suitable manner. In one embodiment, the opposite ends of the support beams 24 are secured to the inner surface of the shell 12 by a beam seat 32 that is welded or otherwise secured to the inner surface of the shell 12. The beam seat 32 may provide a flat, horizontally-extending upper surface on which an undersurface of the end of the support beam 24 is positioned and secured. A bearing plate 34, which may be horizontally-extending, may be welded or otherwise secured to the undersurface of the end of the support beam 24 to provide a larger and stronger bearing surface for the end portion of the support beam 24 that rests on the beam seat 32. A bolting bar 36, which may be vertically-extending, may also be welded or otherwise secured to the inner surface of the shell 12 and then bolted to a vertically-extending plate 38 that is affixed to an elongated web 40 or other portion of the support beam 24. Other ways of securing the opposite ends of the support beams 24 to the shell 12 are contemplated by and are within the scope of the present invention.

Figure 5:
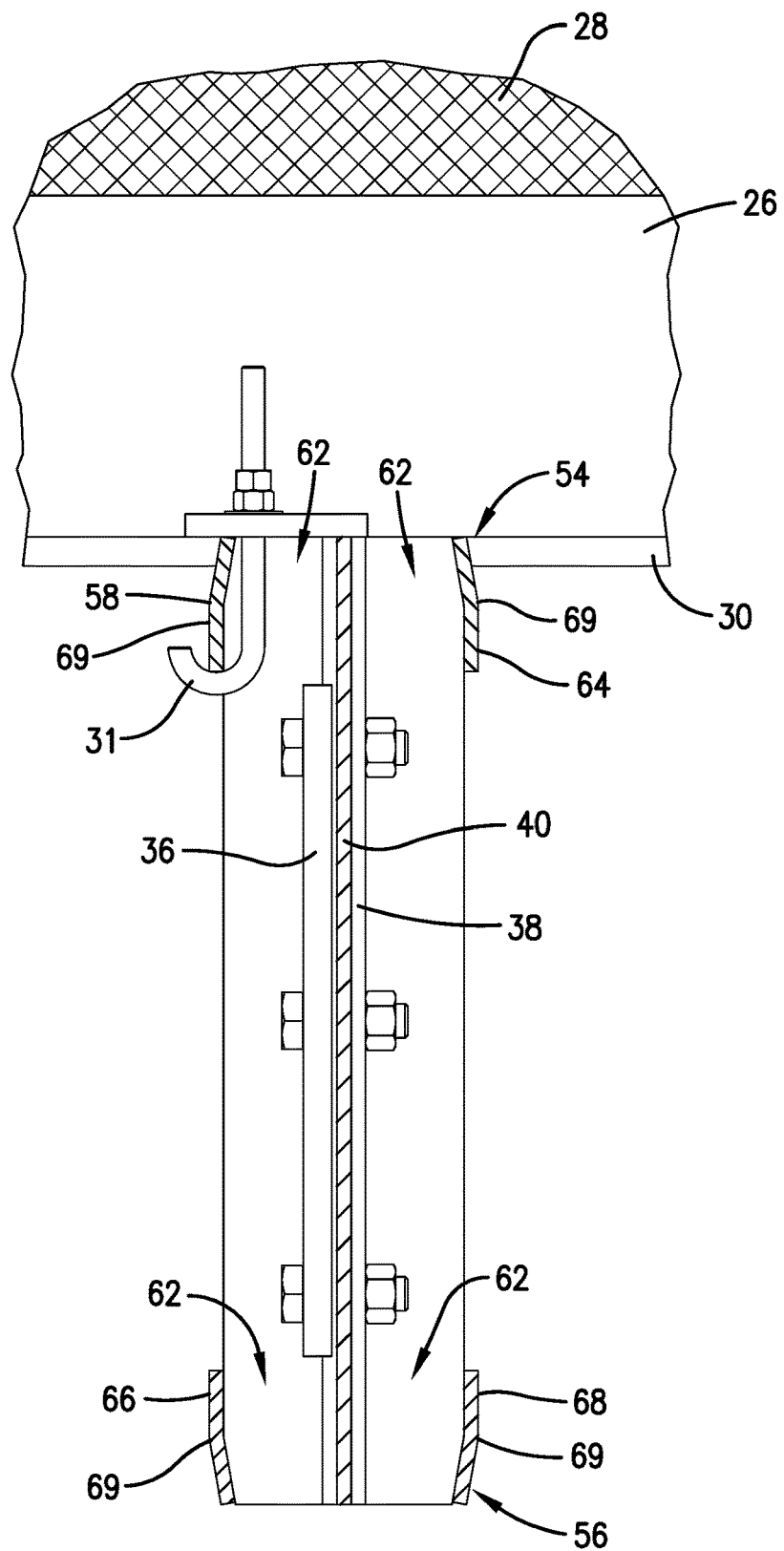
FIG. 5 is an enlarged, fragmentary, end elevation view of one of the support beams according to the first embodiment and the packing grid and the bed of packing and taken in vertical section along line 5-5 of FIG. 3 in the direction of the arrows.
Figure 6:
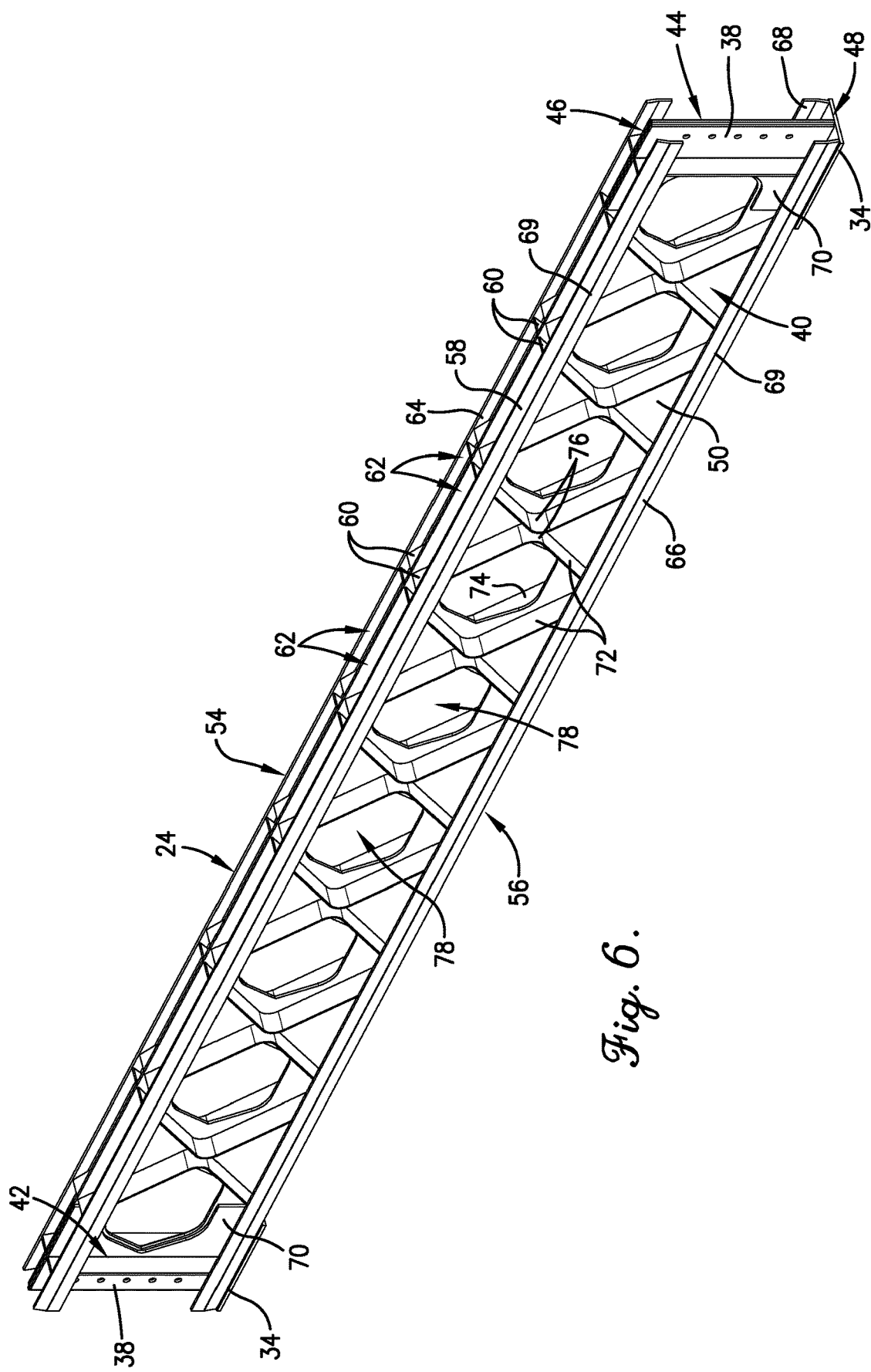
FIG. 6 is a top perspective view of the first embodiment of the support beam.
Figure 10:
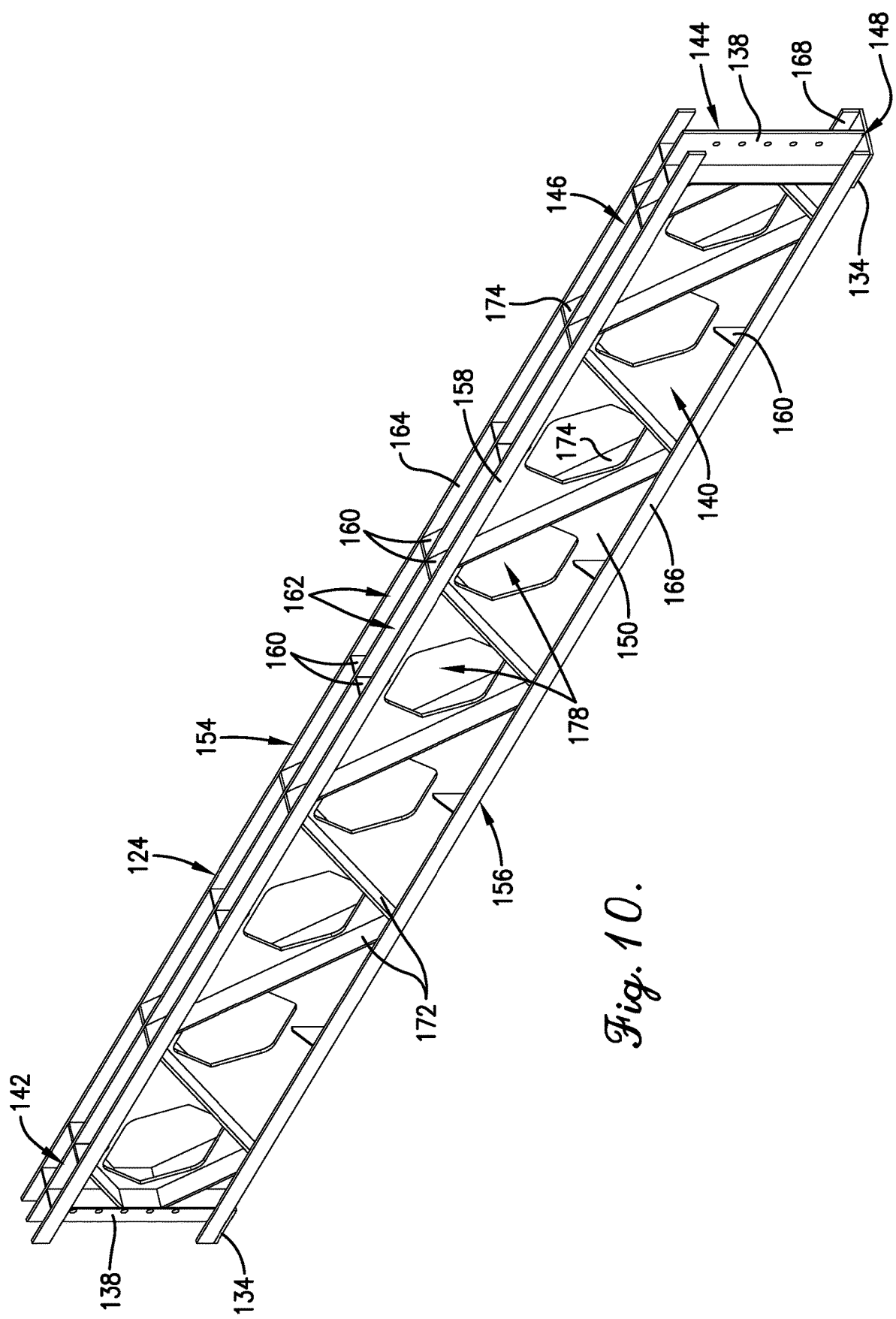
FIG. 10 is a top perspective view of a second embodiment of a support beam of the present invention.
Figure 11:
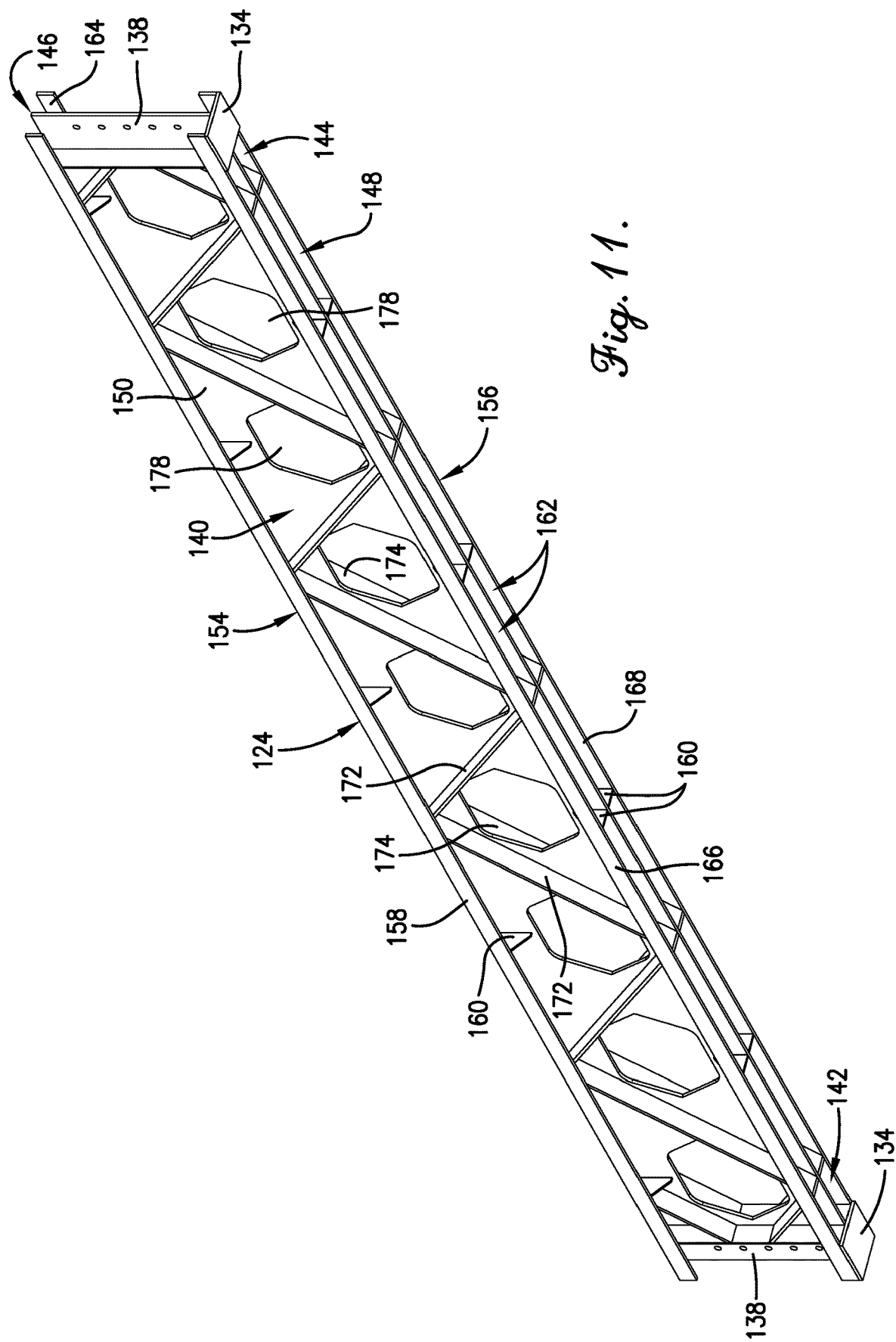
FIG. 11 is a bottom perspective view of the second embodiment of the support beam.
Figure 14:
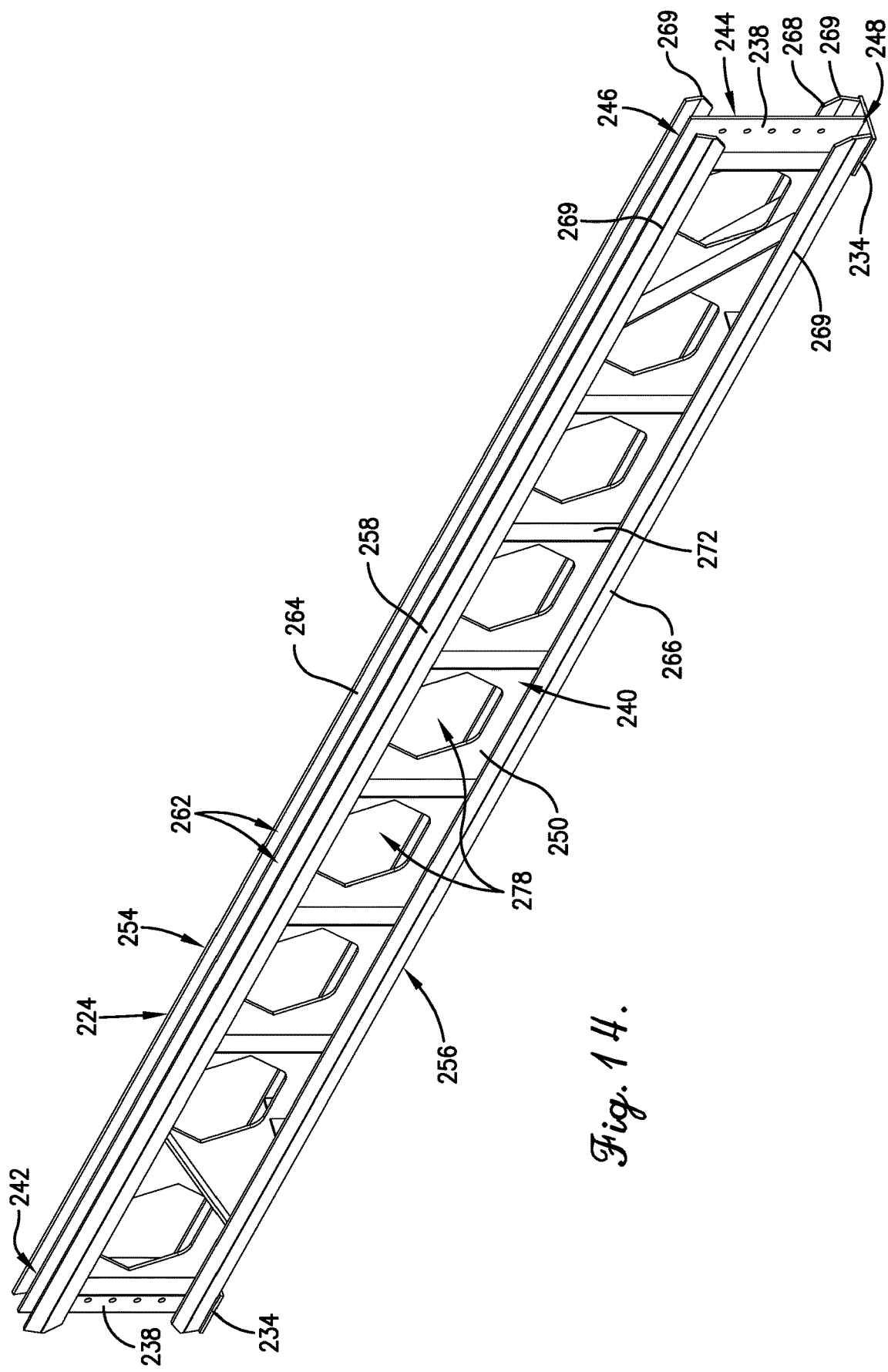
FIG. 14 is a top perspective view of a third embodiment of a support beam of the present invention.
Figure 15:
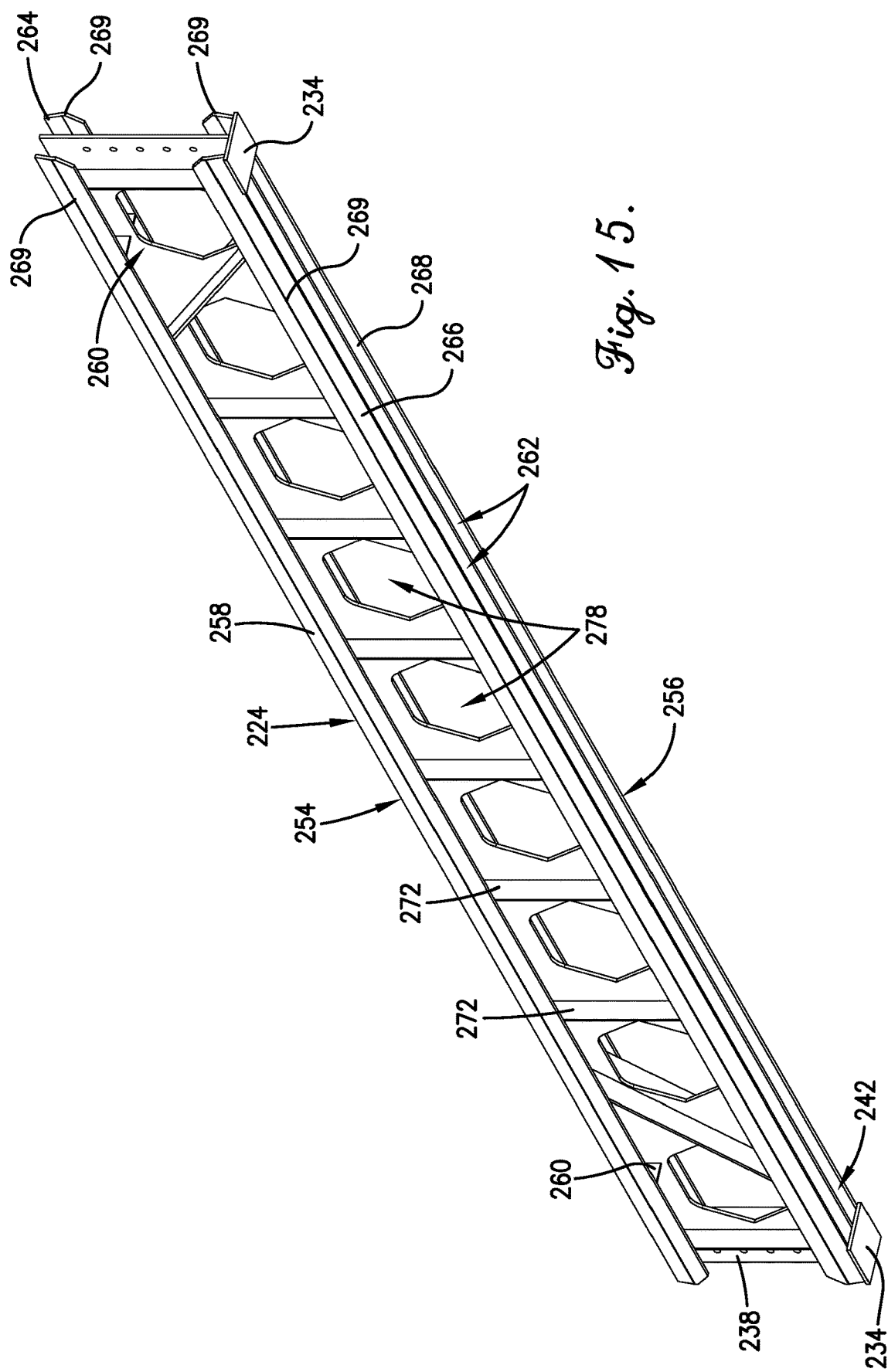
FIG. 15 is a bottom perspective view of the third embodiment of the support beam.
Figure 18:
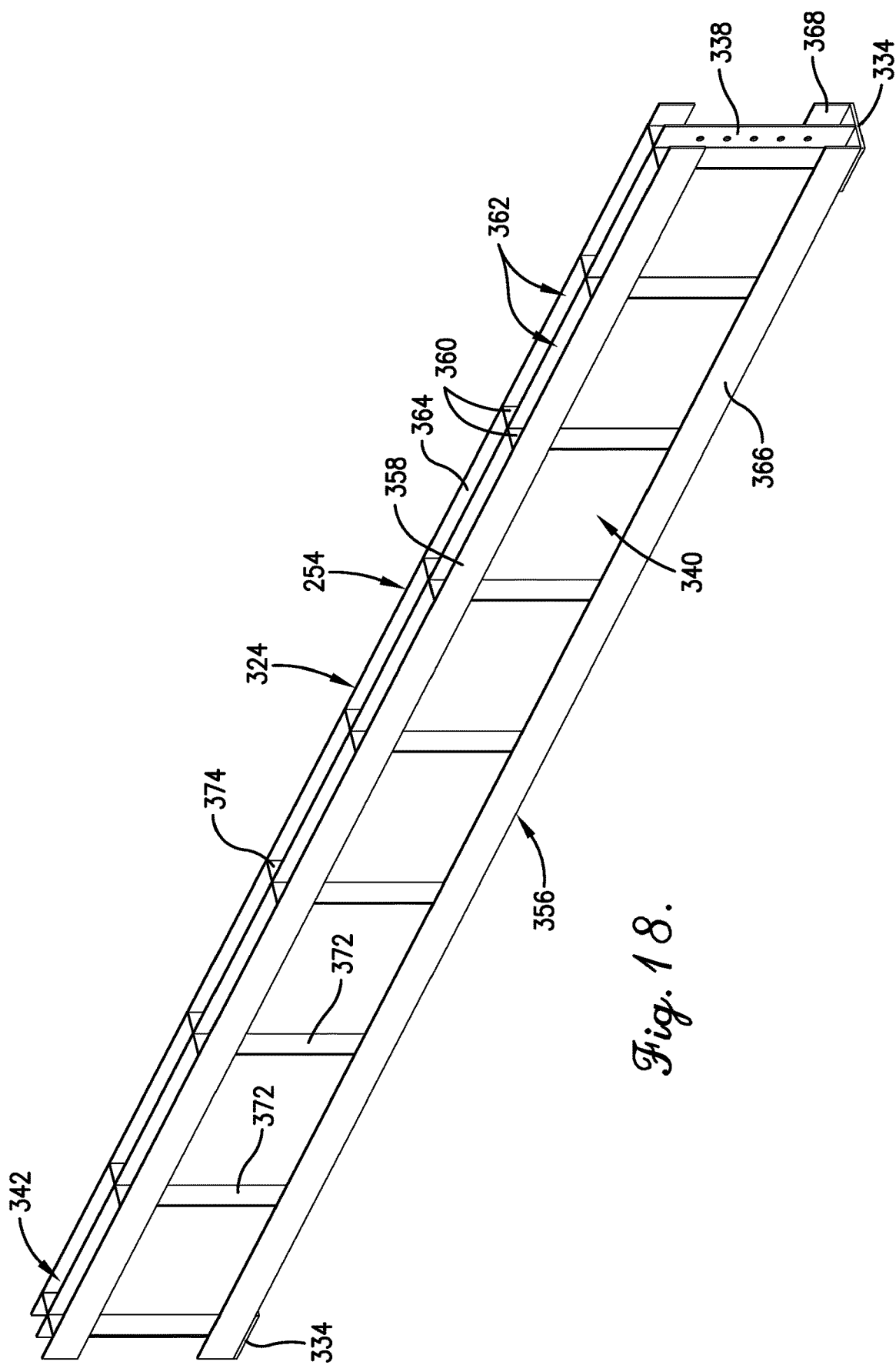
FIG. 18 is a top perspective view of a fourth embodiment of a support beam of the present invention.

Turning additionally to FIGS. 6-9, the elongated web 40 of each support beam 24 has opposed end portions 42 and 44, a longitudinal length that extends in a direction between the opposed end portions 42 and 44, an upper edge portion 46 and a lower edge portion 48, and opposed first and second faces 50 and 52 (FIG. 5). In accordance with the present invention, each of the support beams also includes an upper open flange 54 that is positioned at the upper edge portion 46 of the web 40 and an opposite lower open flange 56 that is positioned at the lower edge portion 48 of the web 40.

The upper open flange 54 has opposed ends and a longitudinal length that may be coextensive with the web 40. The upper open flange 54 comprises a first reinforcement rail 58 extending along and coextensive with the longitudinal length of the web 40 and spaced from the first face 50 of the web 40 by spacers 60 positioned at spaced apart locations along the longitudinal length of the web 40 to create open fluid flow channels 62 between the first reinforcement rail 58 and the first face 50 of the web 40. The upper open flange 54 may further comprise a second reinforcement rail 64 that similarly extends along and is coextensive with the longitudinal length of the web 40 and is spaced from the second face 52 of the web 40 by additional ones of the spacers 60 to create additional ones of the open fluid flow channels 62.

The lower open flange 56 may be constructed in the same or a similar manner to the upper open flange 54. In one embodiment, the lower open flange 56 comprises a third reinforcement rail 66 extending along the longitudinal length of the web 40 and spaced from the first face 50 of the web 40 by additional ones of the spacers 60 positioned at spaced apart locations along the longitudinal length of the web 40 to create additional ones of the open fluid flow channels 62 between the third reinforcement rail 66 and the first face 50 of the web 40. The lower open flange 56 may further comprises a fourth reinforcement rail 68 extending along the longitudinal length of the web 40 and spaced from the second face 52 of the web 40 by additional ones of the spacers 60 positioned at spaced apart locations along the longitudinal length of the web 40 to create additional ones of the open fluid flow channels 62 between the fourth reinforcement rail 68 and the second face 52 of the web 40.

In one embodiment, the first, second, third and fourth reinforcement rails 58, 64, 66, and 68 and the spacers 60 may be planar, or as in the illustrated embodiment, the first, second, third and fourth reinforcement rails 58, 64, 66, and 68 may each include a bend 69 along their longitudinal lengths to strengthen them against deflection. In one embodiment, to reduce the opportunity for liquid holdup and deposition of solids on the first, second, third and fourth reinforcement rails 58, 64, 66, and 68 and on the spacers 60, they do not have any horizontal surfaces other than those that may be formed by the edge thickness of the material that is used in the construction of those rails. The first, second, third and fourth reinforcement rails 58, 64, 66, and 68 and the spacers 60 may extend in an upright orientation. As used herein, the term "upright" is not intended to be limited to a vertical direction but may encompass directions inclined by less than 80 degrees from the vertical. In one embodiment, the first, second, third and fourth reinforcement rails 58, 64, 66, and 68 extend vertically and in parallel to the web 40 of the support beam 24. In some embodiments, the spacers 60 may extend vertically and transversely between the web 40 and the respective first, second, third and fourth reinforcement rails 58, 64, 66, and 68, while in other embodiments they may be inclined in relation to the vertical.

The open fluid flow channels 62 allow fluids and solids to readily flow through the upper open flange 54 and the lower open flange 56 and reduce the opportunity for liquid holdup on the upper open flange 54 and the lower open flange 56 that might otherwise lead to solids deposition and growth on those surfaces. Such deposition and growth of the solids may lead to fouling and coking that impedes performance of the mass transfer column 10 by impeding fluid flow to and from the packing grid 26, the packing 28, or other supported internal(s). The upright orientation of the first and third reinforcement rails 58 and 66 and the second and fourth reinforcement rails 64 and 68 and the spacers 60 likewise reduces the opportunity for liquid holdup and solids accumulation and growth on those surfaces.

In one embodiment, the bearing plates 34 extend transversely to and are affixed to an underside of both the web 40 and the lower open flange 56 to transfer the bearing load to those portions of the support beam 24. Upright stiffening plates 70 may be positioned so that they extend between the first face 50 of the web and the first and third reinforcement rails 58 and 66 at both of their opposite end portions and between the second face 52 of the web 40 and the second and fourth reinforcement rails 64 and 68 at both of their opposite end portions. These stiffening plates 70 serve to reduce the opportunity for deflection of the support beam 24 during operational loads.

To provide additional resistance to deflection, the support beam 24 may be each provided with first truss members 72 having opposite ends and extending along the first face 50 of the web 40 and joined at their opposite ends to the first and third reinforcement rails 58 and 66 and the first face 50 of the web 40. The support beams 24 may also each be provided with second truss members 74 having opposite ends and extending along the second face 52 of the web 40 and joined at their opposite ends to the second and fourth reinforcement rails 64 and 68. The first and second truss members 72 and 74 may each extend diagonally and have a reverse bend 76, such as at their midpoint, so that each truss member 72 and 74 forms a sideways V-shape. In one embodiment, the opposite ends of the first and second truss members 72 and 74 form the spacers 60. In other embodiments, some or all of the spacers 60 are separate from the first and second truss members 72 and 74.

Adjacent ones of the first and second truss members 72 and 74 may be arranged so that their reverse bends 76 face in opposite directions and are spaced apart from each other to allow fluid to flow through the spacing. The first and second truss members 72 and 74 may be further arranged so that they bracket some or all of spaced openings 78 that are provided in the web 40 to allow fluid to pass through the web 40 from the opposed first and second faces 50 and 52. The spaced openings 72 may also be utilized to reduce the material cost of the support beams 24.

It is to be understood that various features of the support beam 24 may be modified and remain within the scope of the present invention. For example, in a second embodiment of a support beam 124 that is shown in FIGS. 6-9 and in which the same reference numerals with the prefix "1" are used to designate the same or similar parts used with support beam 24, first and second truss members 172 and 174 lack the reverse bend 76 used with the first and second truss members 72 and 74 of support beam 24 and extend diagonally from an upper open flange 154 to a lower open flange 156 in a manner to form a repeating W-shaped lattice. The opposite ends of the first and second truss members 172 and 174 form some of the spacers 160 that are positioned between a web 140 and first, second, third and fourth reinforcement rails 158, 164, 166, and 168 to form open fluid flow channels 162. Other ones of the spacers 160 are formed separately and may be located at positions in the upper open flange 154 and lower open flange 156 opposite from the apices formed by adjacent ones of the reinforcement rails.

In another modification used with a third embodiment of a support beam 224 illustrated in FIGS. 14-17 and in which the same reference numerals with the prefix "2" are used to designate the same or similar parts used with the support beam 24, most or all of first and second truss members 274 and 276 extend vertically rather than diagonally. In the illustrated embodiment, the first and second truss members 274 and 276 that are nearest the opposed end portions 242 and 244 extend diagonally to facilitate resistance of the support beam 224 to deformation.

In other modifications used with a fourth embodiment of a support beam 324 illustrated in FIGS. 18-21 and in which the same reference numerals with the prefix "3" are used to designate the same or similar parts used with the support beam 24, the first and second truss members 274 and 276 each extend vertically rather than diagonally. In support beam 324, the spaced openings 78, 178, and 278 used with support beams 24, 124, and 274, respectively, are also omitted and the spacers 260 are each formed by the ends of the first and second truss members 274 and 276. Additional modifications are not limited to those described above.

Figure 22:
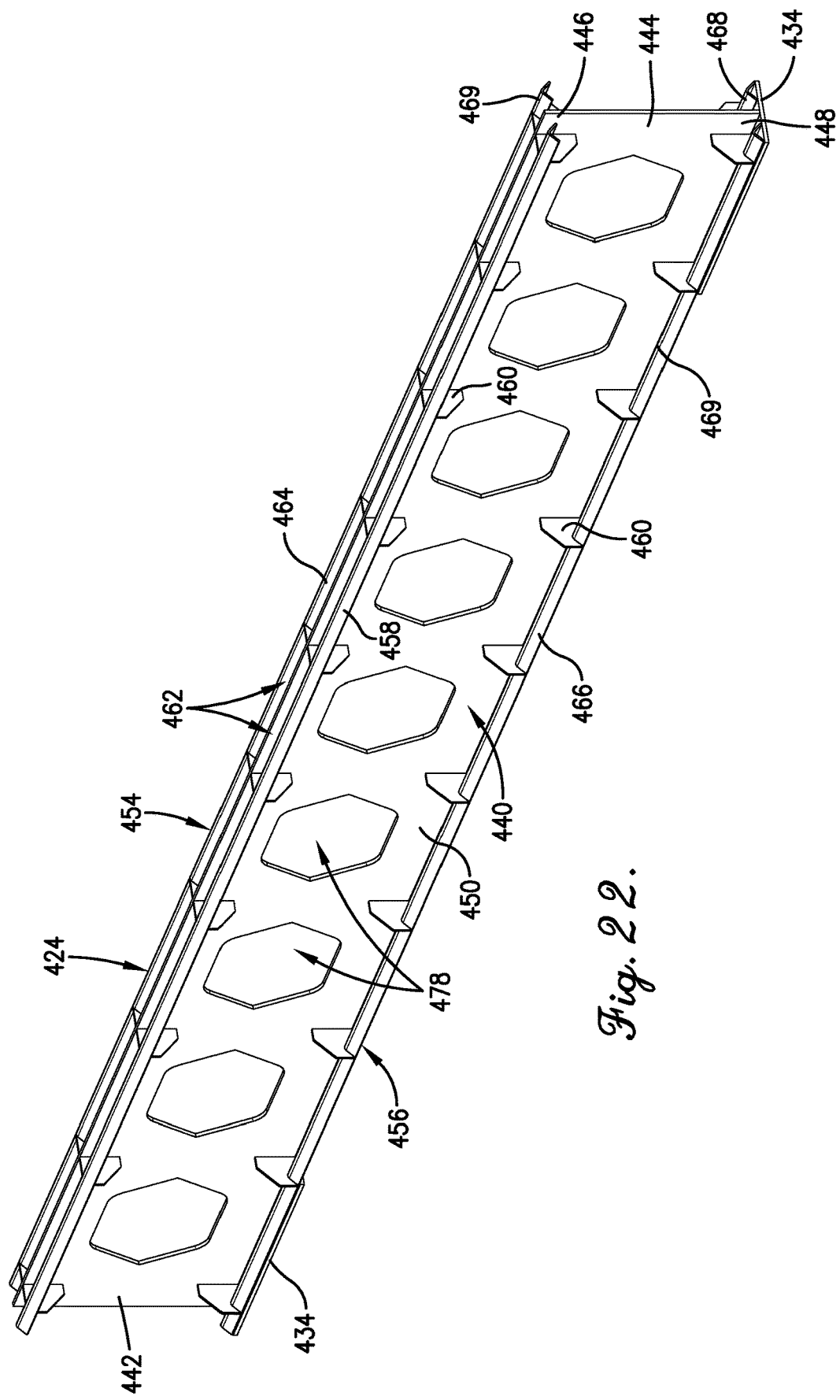
FIG. 22 is a top perspective view of a fifth embodiment of a support beam of the present invention.

In further modifications used with a fifth embodiment of a support beam 424 illustrated in FIG. 22 and in which the same reference numerals with the prefix "4" are used to designate the same or similar parts used with the support beam 24, the first, second, third, and fourth reinforcement rails 458, 464, 466, and 468 of upper open flange 454 and lower open flange 456 are each formed from planar stock that is bent along a longitudinal bend 469 and oriented when attached to spacers 460 to from an upside down "V" orientation. The first, second, third, and fourth reinforcement rails 458, 464, 466, and 468 may be received within notches formed in the spacers 460 to securely hold the first, second, third, and fourth reinforcement rails 458, 464, 466, and 468 in spaced relationship to a web 440 of the support beam 424 and form open fluid flow channels 462 in the spacing. The plates 38, upright stiffening plates 70 and the first and second truss members 72 and 74 used with support beam 24 are not shown in the drawing figure for the support beam 424 but may optionally be used with the support beam 424.

Figure 23:
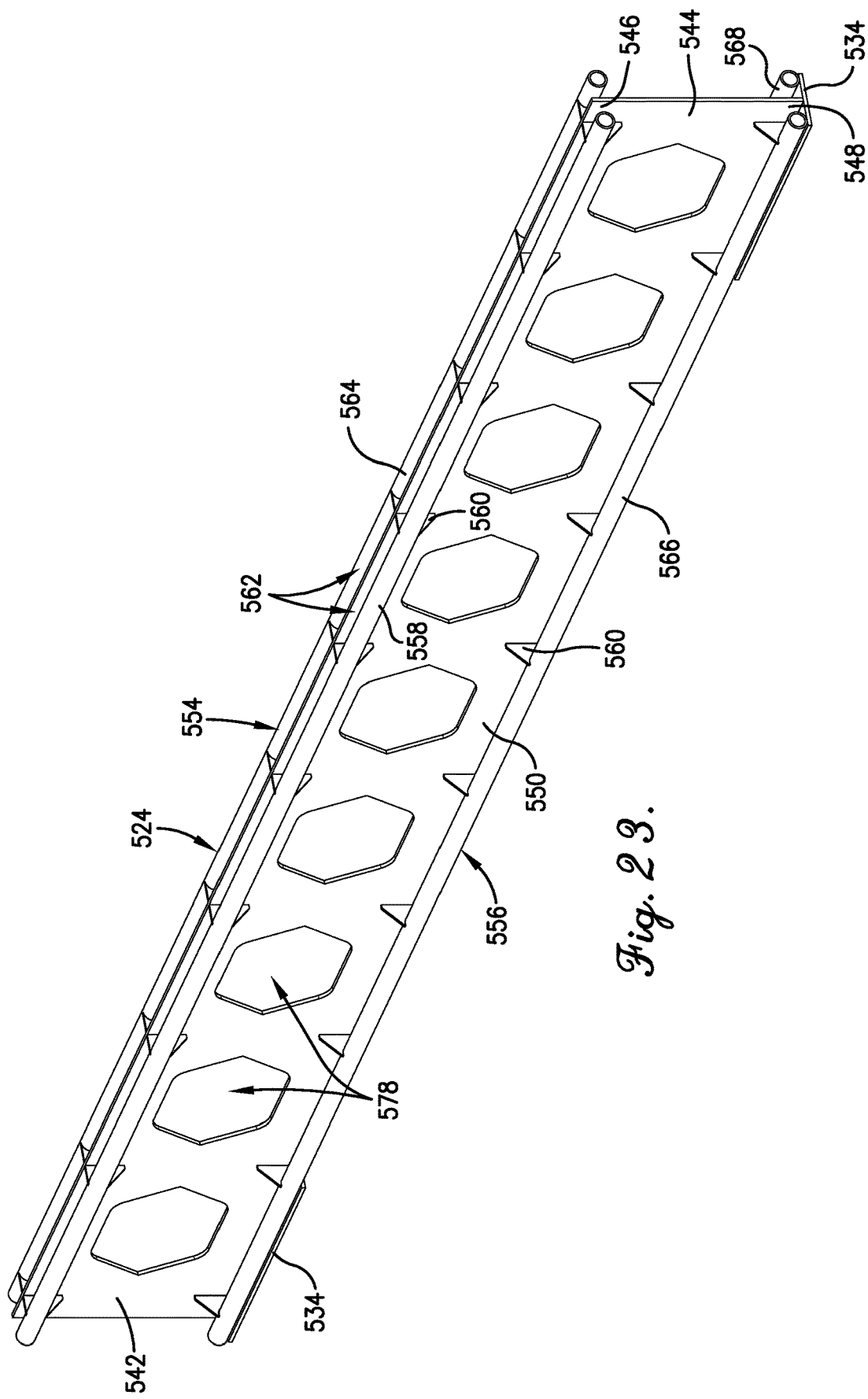
FIG. 23 is a top perspective view of a sixth embodiment of a support beam of the present invention.
Figure 24:
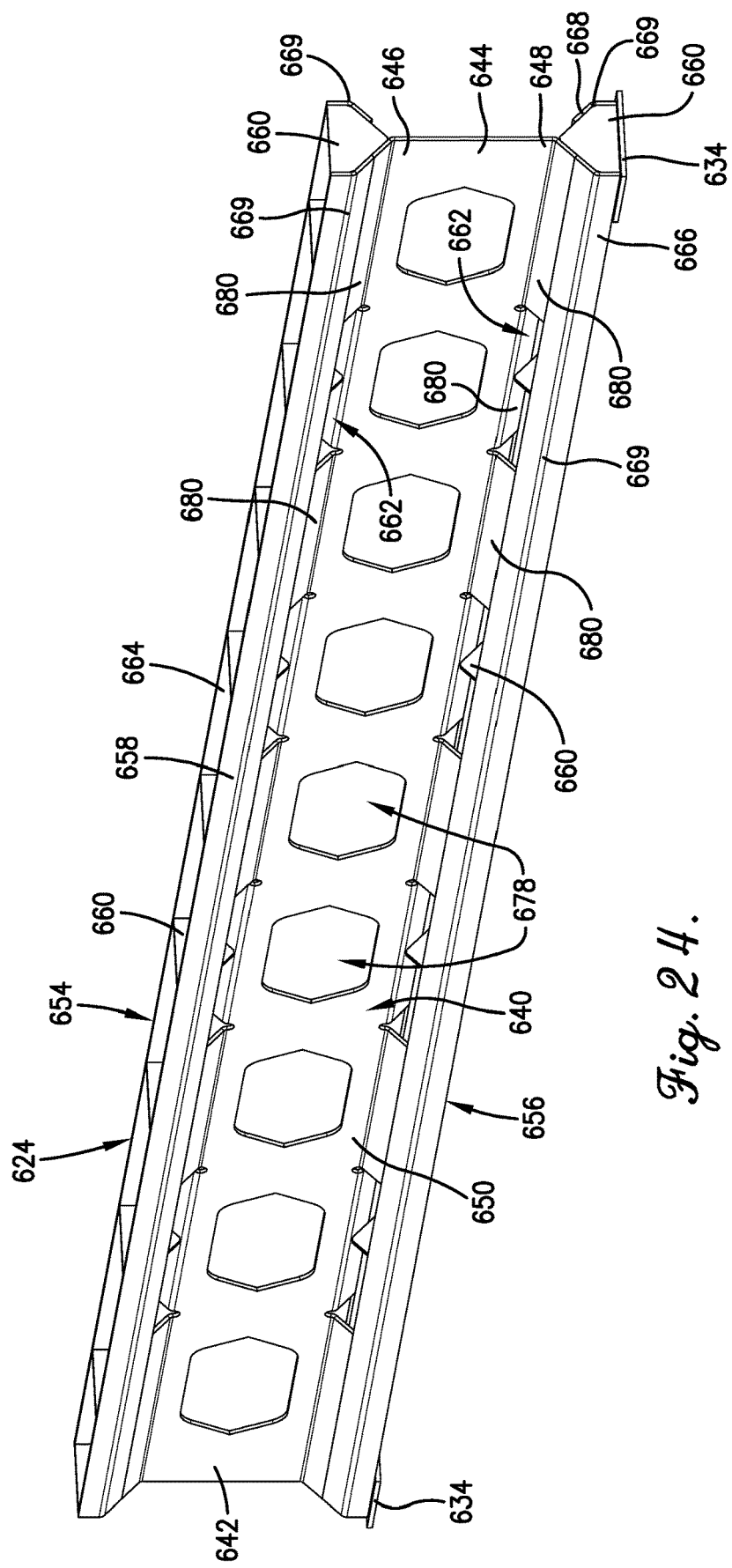
FIG. 24 is a top perspective view of a seventh embodiment of a support beam of the present invention.
Figure 25:
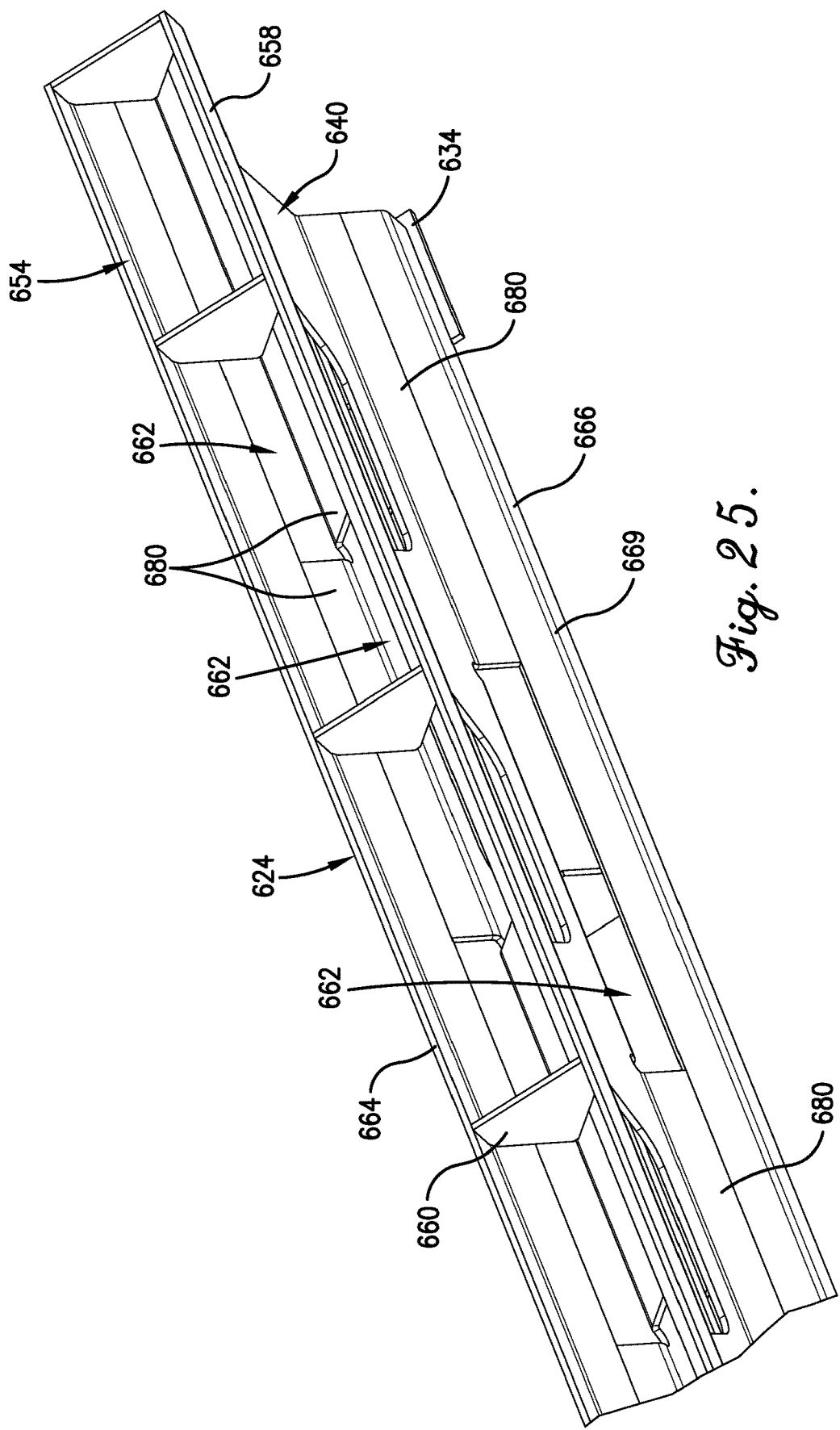
FIG. 25 is a fragmentary, top perspective view of the seventh embodiment of the support beam.

In still further modifications used with a sixth embodiment of a support beam 624 illustrated in FIG. 23 and in which the same reference numerals with the prefix "5" are used to designate the same or similar parts used with the support beam 24, the first, second, third, and fourth reinforcement rails 558, 564, 566, and 568 are formed by pipes rather than the planar stock used with the support beam 24. The first, second, third, and fourth reinforcement rails 558, 564, 566, and 568 may be received within notches formed in the spacers 560 to securely hold the first, second, third, and fourth reinforcement rails 558, 564, 566, and 568 in spaced relationship to a web 540 of the support beam 524 and form open fluid flow channels 562 in the resulting spacing. As in the case of support beam 424, the plates 3, upright stiffening plates 70 and the first and second truss members 72 and 74 used with support beam 24 are not shown in the drawing figure for the support beam 524 but may optionally be used with the support beam 524.

In still other modifications used with a seventh embodiment of a support beam 624 illustrated in FIGS. 24-27 and in which like reference numerals with the prefix "6" are used to designate the same or similar parts used with the support beam 24, the first and second reinforcement rails 658 and 664 are positioned above a web 640 of the support beam 624 and the third and fourth reinforcement rails 666 and 668 are positioned below the web 640. Spacers 660 extend between the first and second reinforcement rails 658 and 664 and other ones of the spacers 660 extend between the third and fourth reinforcement rails 666 and 668. The first and second reinforcement rails 658 and 664 may be connected to the web 640 by angled supports 680 that are arranged such some of the angled supports 680 are inclined toward and are connected to a lower edge of the first reinforcement rail 658 and others of the angled supports 680 are inclined toward and are connected to a lower edge of the second reinforcement rail 664. In one embodiment, alternating ones of the angled supports 680 are inclined in opposite directions such that the open fluid flow channels 662 in the upper open flange 654 are formed between adjacent ones of the angled supports 680 that extend in the same direction. The third and fourth reinforcement rails 666 and 668 in the lower open flange 656 may be connected to the web 640 using others of the angled supports 680 in the same manner as in the upper open flange 654. In one embodiment, the angled supports 680 are formed by cutting and bending upper and lower portions of the web 640 so that the angled supports 680 and the web 640 are of a one-piece construction.

From the foregoing, it will be seen that this invention is one well adapted to attain all the ends and objectives hereinabove set forth, together with other advantages that are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A support beam for supporting an internal within a mass transfer column, said support beam comprising:
   an elongated web having opposed end portions, a longitudinal length extending in a direction between the opposed end portions, an upper edge portion, a lower edge portion, and opposed first and second faces;
   an upper open flange positioned at the upper edge portion of the web and having opposed ends, said upper open flange comprising:
      a first reinforcement rail extending along the longitudinal length of the web and spaced from the first face of the web by spacers positioned at spaced apart locations along the longitudinal length of the web to create open fluid flow channels between the first reinforcement rail and the first face of the web, and
      a second reinforcement rail extending along the longitudinal length of the web and spaced from the second face of the web by spacers positioned at spaced apart locations along the longitudinal length of the web to create open fluid flow channels between the second reinforcement rail and the second face of the web; and
   a lower open flange positioned at the lower edge portion of the web and having opposed ends, said lower open flange comprising:
      a third reinforcement rail extending along the longitudinal length of the web and spaced from the first face of the web by spacers positioned at spaced apart locations along the longitudinal length of the web to create open fluid flow channels between the third reinforcement rail and the first face of the web, and
      a fourth reinforcement rail extending along the longitudinal length of the web and spaced from the second face of the web by spacers positioned at spaced apart locations along the longitudinal length of the web to create open fluid flow channels between the fourth reinforcement rail and the second face of the web.

2. The support beam of claim 1, including bearing plates extending transversely and affixed to an underside of the web and the lower open flange at the opposed end portions of the web.

3. The support beam of claim 2, including stiffening plates extending between the first face of the web and the first and third reinforcement rails at both of the opposed end portions of the web and between the second face of the web and the second and fourth reinforcement rails at both of the opposed end portions of the web.

4. The support beam of claim 3, including spaced openings in the web to allow fluid to pass through the web from the opposed first and second faces.

5. The support beam of claim 4, including bends in the first, second, third, and fourth reinforcement rails along longitudinal lengths of the first, second, third, and fourth reinforcement rails to strengthen the first, second, third, and fourth reinforcement rails against deflection.

6. The support beam of claim 4, including first truss members having opposite ends and extending along the first face of the web, the opposite ends of the first truss members being joined to the first and third reinforcement rails and the first face of the web, and second truss members having opposite ends and extending along the second face of the web, the opposite ends of the second truss members being joined to the second and fourth reinforcement rails.

7. The support beam of claim 6, wherein the first and second truss members extend upright and the opposite ends of the first and second truss members form the spacers.

8. The support beam of claim 6, wherein the first and second truss members extend diagonally.

9. The support beam of claim 6, wherein the first and second truss members extend diagonally and include a reverse bend.

10. A mass transfer column comprising:
    a shell defining an open internal region;
    a fluid inlet in the shell for introducing a fluid through the shell and into the open internal region;
    a fluid outlet in the shell for removing a fluid from the open internal region through the shell;
    a plurality of support beams of claim 1 extending in parallel and sideways-spaced-apart relationship across a horizontal cross section of the mass transfer column within the open internal region and secured at opposite ends to the shell; and an internal positioned within the open internal region and supported by the plurality of support beams.

11. The mass transfer column of claim 10, including beam seats attached to an inner surface of the shell and joined to the opposite ends of the plurality of support beams.

12. The mass transfer column of claim 11, including bolting bars attached to the inner surface of the shell and joined to the webs of said plurality of support beams.

13. The mass transfer column of claim 12, wherein each of the support beams in said plurality of support beams includes bearing plates extending transversely and affixed to an underside of the web and the lower open flange at the opposed end portions of the web and wherein said bearing plates rest on said beam seats.

14. The mass transfer column of claim 13, wherein each of the support beams in said plurality of support beams includes upright stiffening plates extending between the first face of the web and the first and third reinforcement rails at both of the opposed end portions of the web and between the second face of the web and the second and fourth reinforcement rails at both of the opposed end portions of the web.

15. The mass transfer column of claim 14, wherein each of the support beams in said plurality of support beams includes bends in the first, second, third, and fourth reinforcement rails along longitudinal lengths of the first, second, third, and fourth reinforcement rails to strengthen the first, second, third, and fourth reinforcement rails against deflection.

16. The mass transfer column of claim 14, wherein each of the support beams in said plurality of support beams includes spaced openings in the web to allow fluid to pass through the web from the opposed first and second faces, first truss members having opposite ends and extending along the first face of the web, the opposite ends of the first truss members being joined to the first and third reinforcement rails and the first face of the web, and second truss members having opposite ends and extending along the second face of the web, the opposite ends of the second truss members being joined to the second and fourth reinforcement rails.

17. The mass transfer column of claim 16, wherein in each of the support beams in said plurality of support beams the first and second truss members extend upright and the opposite ends of the first and second truss members form the upright spacers.

18. The mass transfer column of claim 16, wherein in each of the support beams in said plurality of support beams the first and second truss members extend diagonally.

19. The mass transfer column of claim 16, wherein in each of the support beams in said plurality of support beams the first and second truss members extend diagonally and include a reverse bend.

20. A support beam for supporting an internal within a mass transfer column, said support beam comprising:

an elongated web having opposed end portions, a longitudinal length extending in a direction between the opposed end portions, an upper edge portion, a lower edge portion, and opposed first and second faces;

an upper open flange positioned at the upper edge portion of the web and having opposed ends, said upper open flange comprising:
an upright first reinforcement rail extending along the longitudinal length of the web and spaced from the first face of the web by upright spacers positioned at spaced apart locations along the longitudinal length of the web to create open fluid flow channels between the first reinforcement rail and the first face of the web, and
an upright second reinforcement rail extending along the longitudinal length of the web and spaced from the second face of the web by upright spacers positioned at spaced apart locations along the longitudinal length of the web to create open fluid flow channels between the second first reinforcement rail and the second face of the web;

a lower open flange positioned at the lower edge portion of the web and having opposed ends, said lower open flange comprising:
an upright third reinforcement rail extending along the longitudinal length of the web and spaced from the first face of the web by spacers positioned at spaced apart locations along the longitudinal length of the web to create open fluid flow channels between the third reinforcement rail and the first face of the web, and
an upright fourth reinforcement rail extending along the longitudinal length of the web and spaced from the second face of the web by upright spacers positioned at spaced apart locations along the longitudinal length of the web to create open fluid flow channels between the fourth reinforcement rail and the second face of the web;

bearing plates extending transversely and affixed to an underside of the web and the lower open flange at the opposed end portions of the web;

upright stiffening plates extending between the first face of the web and the first and third reinforcement rails at both of the opposed end portions of the web and between the second face of the web and the second and fourth reinforcement rails at both of the opposed end portions of the web;

spaced openings in the web to allow fluid to pass through the web from the opposed first and second faces;

bends in the first, second, third, and fourth reinforcement rails along longitudinal lengths of the first, second, third, and fourth reinforcement rails to strengthen the first, second, third, and fourth reinforcement rails against deflection; and first truss members having opposite ends and extending along the first face of the web, the opposite ends of the first truss members being joined to the first and third reinforcement rails and the first face of the web, and second truss members having opposite ends and extending along the second face of the web, the opposite ends of the second truss members being joined to the second and fourth reinforcement rails, wherein the first and second truss members extend upright, diagonally, or diagonally with a reverse bend.

* * * * *